US012335832B2

(12) United States Patent
Agarwal et al.

(10) Patent No.: US 12,335,832 B2
(45) Date of Patent: Jun. 17, 2025

(54) METHOD AND UE FOR SELECTING PLMN WITH DISASTER CONDITION TO RECEIVE DISASTER ROAMING SERVICE

(71) Applicant: Samsung Electronics Co., Ltd., Suwon-si (KR)

(72) Inventors: Aman Agarwal, Bangalore (IN); Lalith Kumar, Bangalore (IN); Kailash Kumar Jha, Bangalore (IN); Samiran Bhowmik, Bangalore (IN); Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 332 days.

(21) Appl. No.: 17/703,918

(22) Filed: Mar. 24, 2022

(65) Prior Publication Data

US 2022/0312173 A1     Sep. 29, 2022

(30) Foreign Application Priority Data

Mar. 24, 2021 (IN) .............................. 202141012880
Apr. 8, 2021 (IN) .............................. 202141016616
Mar. 18, 2022 (IN) .............................. 202141012880

(51) Int. Cl.
*H04W 4/90* (2018.01)
*H04W 8/12* (2009.01)
(Continued)

(52) U.S. Cl.
CPC .............. *H04W 4/90* (2018.02); *H04W 8/12* (2013.01); *H04W 48/18* (2013.01); *H04W 60/04* (2013.01); *H04W 84/042* (2013.01)

(58) Field of Classification Search
CPC ......... H04W 4/90; H04W 8/12; H04W 48/18; H04W 60/04
(Continued)

(56) References Cited

U.S. PATENT DOCUMENTS

2020/0084741 A1\* 3/2020 Chun .................... H04W 12/08
2022/0070815 A1\* 3/2022 Chun .................... H04W 48/16
(Continued)

FOREIGN PATENT DOCUMENTS

| WO | 2020141956 A1 | 7/2020 |
| WO | 2020141964 A1 | 7/2020 |

OTHER PUBLICATIONS

3GPP;TSGCT;Study on the support for minimization of service interruption;(Release17), 3GPPTR 24.811V1.0.0,12 (Year: 2021).\*
(Continued)

*Primary Examiner* — Maria El-Zoobi

(57) ABSTRACT

The disclosure relates to a 5G or 6G communication system for supporting a higher data transmission rate. The embodiment herein is to disclose a method for selecting PLMN with disaster condition (PLMN-D) to receive disaster roaming service in an area. The method includes detecting, by a UE, a disaster condition in the area. Further, the method includes detecting, by the UE, a forbidden PLMN (FPLMN) broadcasting a plurality of PLMN-Ds in the area. Further, the method includes selecting, by the UE, the at least one PLMN-D from the plurality of PLMN-D based on a predefined sequence of priority order. Further, the method includes camping, by the UE, the FPLMN corresponding to the at least one selected PLMN-D. Further, the method includes triggering, by the UE, a registration procedure on the camped FPLMN by indicating the at least one selected PLMN-D in the registration request message.

15 Claims, 10 Drawing Sheets

(51) Int. Cl.
*H04W 48/18* (2009.01)
*H04W 60/04* (2009.01)
*H04W 84/04* (2009.01)

(58) Field of Classification Search
USPC ....................................................... 455/404.1
See application file for complete search history.

(56) References Cited

U.S. PATENT DOCUMENTS

2022/0086743 A1 3/2022 Chun
2022/0264275 A1* 8/2022 Vamanan ................ H04W 4/90

OTHER PUBLICATIONS

Examination report dated Oct. 12, 2022, in connection with Indian Application No. 202141012880, 5 pages.
International Search Report and Written Opinion of the International Searching Authority dated Jun. 17, 2022, in connection with International Application No. PCT/KR2022/004138, 8 pages.
3GPP TS 22.011 V17.3.0 (Dec. 2020), Technical Specification, 3rd Generation Partnership Project; Technical Specification Group Services and System Aspects; Service accessibility (Release 17), Dec. 2020, 34 pages.
3GPP TR 22.831 V17.1.0 (Dec. 2019), Technical Report, 3rd Generation Partnership Project; Technical Specification Group Services and System Aspects; Study on Support for Minimization of Service Interruption (Release 17), Dec. 2019, 19 pages.
3GPP TR 24.811 V1.0.0 (Mar. 2021), Technical Report, 3rd Generation Partnership Project; Technical Specification Group Core Network and Terminals; Study on the support for minimization of service interruption; (Release 17), Mar. 2021, 94 pages.
Supplementary European Search Report dated Aug. 8, 2024, in connection with European Patent Application No. 22776123.6, 20 pages.
3GPP TS 23.122 V17.1.1 (Jan. 2021), Technical Specification, 3rd Generation Partnership Project; Technical Specification Group Core Network and Terminals; Non-Access-Stratum (NAS) functions related to Mobile Station (MS) in idle mode (Release 17), Jan. 2021, 88 pages.

* cited by examiner

METHOD AND UE FOR SELECTING PLMN WITH DISASTER CONDITION TO RECEIVE DISASTER ROAMING SERVICE

CROSS REFERENCE TO RELATED APPLICATIONS

This application is based on and claims priority under 35 U.S.C. § 119(a) to Indian Provisional Patent Application Serial No. 202141012880 (PS), filed on Mar. 24, 2021, in the Indian Intellectual Property Office, to Indian Provisional Patent Application Serial No. 202141016616 (PS), filed on Apr. 8, 2021, in the Indian Intellectual Property Office, and to Indian Complete Patent Application Serial No. 202141012880 (CS), filed on Mar. 18, 2022, in the Indian Intellectual Property Office, the disclosure of which are incorporated herein by reference in their entireties.

BACKGROUND

1. Field 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The present disclosure relates to a method and a user equipment (UE) for selecting disaster roaming service provider based on a public land mobile network (PLMN) facing disaster, and more specifically related to the UE and the method for selecting the forbidden PLMN (FPLMN) and the PLMN with a disaster condition to receive a disaster roaming service. This application is based on and derives the benefit of Indian Provisional Application 202141012880 filed on 24 Mar. 2021, and Indian Provisional Application 202141016616 filed on 8 Apr. 2021, the contents of which are incorporated herein by reference.

2. Description of Related Art

In general, the purpose of a mobile information and network technologies (MINT) is to minimize interruption of service to users when a network to which the users are subscribed and cannot provide service due to a disaster such as e.g., a fire, earthquake, by enabling the users to obtain service on other networks, while at the same time protecting those other networks from congestion.

Based on the existing methods, when the UE (100) has lost coverage of current serving PLMN or if the UE (100) identifies that the disaster situation has occurred, and in a given area if one PLMN (PLMN A) indicates to the UE (100) (for example by broadcast) that the PLMN supports to provide disaster roaming services for multiple PLMNs (PLMN D1, PLMN D2 and PLMN D3), for which among the indicated networks (PLMN D1, PLMN D2 or PLMN D3) may, the UE (100) select and request for disaster roaming services when the UE (100) camps and registers for disaster roaming services on PLMN A is not defined as per the prior art.

When the UE (100) has lost coverage of current serving PLMN or if the UE (100) identifies that the disaster situation has occurred, and in a given area if more than one PLMN-A(s) (PLMN A1, PLMN A2 and PLMN A3) are alive and indicate to the UE (100) (for example by broadcast) that more than one PLMN-A(s) support to provide disaster roaming services for different PLMN-D(s) i.e., PLMN D1, PLMN D2 and PLMN D3 respectively. On which among the available networks (PLMN A1 or PLMN A2 or PLMN A3) may UE (100) select, try and register for the disaster roaming services is not defined as per the prior art.

Thus, it is desired to address the above-mentioned disadvantages or other shortcomings or at least provide a useful alternative.

The principal object of the embodiments herein is to provide a method and a UE for selecting a FPLMN and a PLMN with a disaster condition to receive a disaster roaming service.

Another object of the embodiments herein is to provide that the UE determines only forbidden PLMNs available in the area i.e., PLMNs not part of FPLMN list is not available.

Another object of the embodiments herein is to provide that the UE selects highest priority "PLMN with disaster condition" which is broadcasted by at least one FPLMN in the area.

Another object of the embodiments herein is to provide that the UE selects final selected FPLMN based on the selected "PLMN with disaster condition."

Another object of the embodiments herein is to provide that the UE selects the cell and camps on the final selected FPLMN, sends registration request message to a network of final selected FPLMN and indicates the selected PLMN with the disaster condition.

Another object of the embodiments herein is to provide that the UE selects a highest priority PLMN with a disaster condition which is broadcasted by at least one FPLMN in a below priority order (i.e., registered public land mobile network (RPLMN), PLMN part of user public land mobile network (UPLMN) list in priority order, PLMN part of OPLMN list in priority order and any other PLMNs).

Another object of the embodiments herein is to provide that the UE selects the highest priority FPLMN in the "list of PLMN(s) to be used in disaster condition" as final selected FPLMN in response to determining that at least one FPLMN is broadcasting selected PLMN with disaster condition and "list of PLMN(s) to be used in disaster condition" is configured in the UE by the selected PLMN with disaster condition.

Another object of the embodiments herein is to provide that the UE selects one of the FPLMN randomly as final selected FPLMN in response to determining that at least one FPLMN is broadcasting selected PLMN with disaster condition and "list of PLMN(s) to be used in disaster condition" is not configured in the UE by selected PLMN with disaster condition or "list of PLMN(s) to be used in disaster condition" does not contain the FPLMN broadcasting selected PLMN with disaster condition.

Another object of the embodiments herein is to provide that a "list of PLMN(s) to be used in disaster condition" is configured in the UE by selected "PLMN with disaster condition" before disaster condition occurs, where the selected "PLMN with disaster condition" is one of the home PLMN (HPLMN) or a visited PLMN (VPLMN) which is not part of FPLMN list.

SUMMARY

Accordingly, the embodiment herein is to disclose a method for selecting forbidden PLMN (FPLMN) and PLMN with disaster condition (PLMN-D) to receive disaster roaming service in an area. The method includes detecting, by a UE, a disaster condition in the area. Further, the method includes detecting, by the UE, a FPLMN broadcasting a plurality of PLMN-D's in the area. Further, the method includes selecting, by the UE, the at least one PLMN-D from the plurality of PLMN-D based on a predefined sequence of priority order. Further, the method includes camping, by the UE, the FPLMN corresponding to the at least one selected PLMN-D. Further, the method includes triggering, by the UE, a registration procedure on the camped FPLMN by indicating the at least one selected PLMN-D in the registration request message.

In an embodiment, the predefined sequence of the priority order includes a registered public land mobile network (RPLMN), an HPLMN, a highest priority EHPLMN, each PLMN in a "user controlled PLMN selector with access technology" data file in a SIM, each PLMN in the "operator controlled PLMN selector with access technology" data file in the SIM or stored in the UE, and a random order.

In an embodiment, the at least one selected PLMN-D is one of a HPLMN, EHPLMN and a VPLMN which is not part of a FPLMN list configured at the UE.

In an embodiment, the UE detects disaster condition when there is only FPLMNs are available in the area and FPLMNs are broadcasting at least one PLMN-D.

Accordingly, the embodiment herein is to disclose a method for selecting forbidden PLMN (FPLMN) and PLMN with disaster condition (PLMN-D) to receive disaster roaming service in an area. The method includes detecting, by a UE, a disaster condition in the area. Further, the method includes detecting, by the UE, a plurality of FPLMNs each of which is broadcasting at least one PLMN-D. Further, the method includes selecting, by the UE, the at least one PLMN-D broadcasted by at least one FPLMN from the plurality of FPLMNs based on a predefined sequence of priority order. Further, the method includes selecting, by the UE, a FPLMN from the plurality of FPLMNs corresponding to the at least one selected PLMN-D. Further, the method includes camping, by the UE, the FPLMN corresponding to the at least one selected PLMN-D. Further, the method includes triggering, by the UE, a registration procedure on the camped FPLMN by indicating at least one selected PLMN-D in the registration request message.

In an embodiment, the UE detects disaster condition when there is only FPLMNs are available in the area and FPLMNs are broadcasting at least one PLMN-D In an embodiment, selecting, by the UE, the at least one PLMN-D broadcasted by the at least one FPLMN from the plurality of FPLMNs based on the predefined sequence of priority order includes determining, by the UE, the at least one PLMN-D with highest priority from a plurality of broadcasted PLMN-D by the at least one FPLMN from the plurality of FPLMNs and selecting, by the UE, the at least one PLMN-D with highest priority broadcasted by the at least one FPLMN from the plurality of FPLMNs based on a predefined sequence of priority order.

In an embodiment, selecting, by the UE, the at least one FPLMN from the plurality of FPLMNs corresponding to the at least one selected PLMN-D includes determining, by the UE, whether at least one FPLMN is broadcasting the at least one selected PLMN-D and a list of PLMNs to be used in the disaster condition is configured by the selected PLMN-D at the UE, and performing, by the UE, one of: selecting the at least one FPLMN with highest priority in a list of PLMNs to be used in the disaster condition as final selected FPLMN in response to determining that the at least one FPLMN is broadcasting the selected PLMN-D and the list of PLMNs to be used in the disaster condition is configured by the selected PLMN-D at the UE, and selecting one of the FPLMN randomly as a final selected FPLMN in response to determining that the at least one FPLMN is broadcasting the selected PLMN-D and the list of PLMNs to be used in the disaster condition is not configured at the UE by the selected PLMN-D.

In an embodiment, "the list of PLMN(s) to be used in disaster condition" is configured in the UE by selected PLMN-D before disaster condition has occurred.

Accordingly, the embodiment herein is to disclose a UE for selecting FPLMN and PLMN with disaster condition (PLMN-D) to receive disaster roaming service in an area. The UE includes a PLMN selection controller communicatively coupled to a memory and a processor. The PLMN selection controller is configured to detect a disaster condition in the area and detect a FPLMN broadcasting a plurality of PLMN-D's in the area. Further, the PLMN selection controller is configured to select the at least one PLMN-D from the plurality of PLMN-D based on a predefined sequence of priority order. Further, the PLMN selection controller is configured to camp the FPLMN corresponding to the at least one selected PLMN-D. Further, the PLMN selection controller is configured to trigger a registration procedure on the camped FPLMN by indicating the at least one selected PLMN-D in the registration request message.

Accordingly, the embodiment herein is to disclose a UE for selecting FPLMN and PLMN with disaster condition (PLMN-D) to receive disaster roaming service in an area. The UE includes a PLMN selection controller communicatively coupled to a memory and a processor. The PLMN selection controller is configured to detect the disaster condition in the area. Further, the PLMN selection controller is configured to detect a plurality of FPLMNs each of which is broadcasting at least one PLMN-D. Further, the PLMN selection controller is configured to select the at least one PLMN-D broadcasted by at least one FPLMN from the plurality of FPLMNs based on a predefined sequence of priority order. Further, the PLMN selection controller is configured to select a FPLMN from the plurality of FPLMNs corresponding to the at least one selected PLMN-D. Further, the PLMN selection controller is configured to camp the FPLMN corresponding to the at least one selected PLMN-D. Further, the PLMN selection controller is configured to trigger a registration procedure on the selected or camped FPLMN by indicating at least one selected PLMN-D in the registration request message.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which.

DETAILED DESCRIPTION

Figure 1:
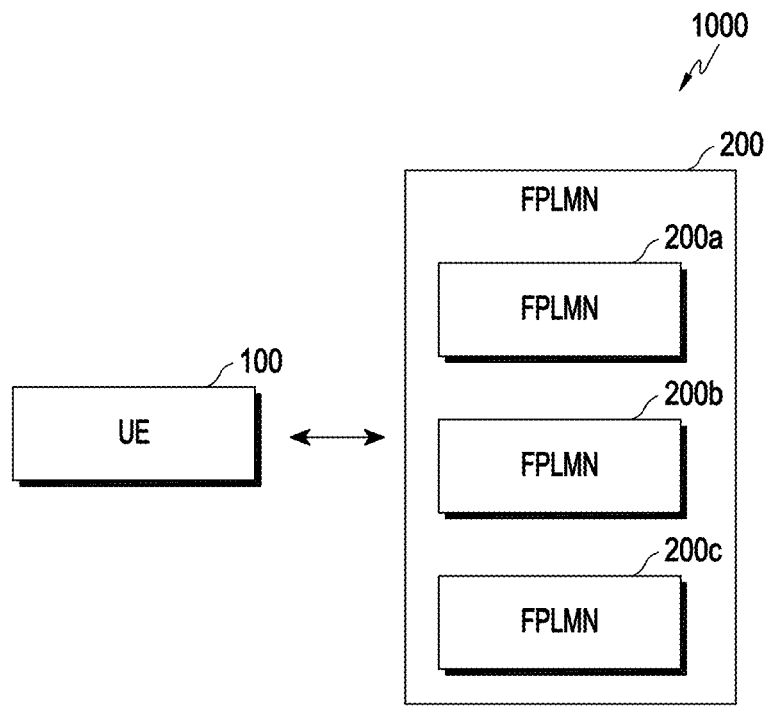
FIG. 1 illustrates overview of a wireless network for handling a FPLMN and a PLMN with a disaster condition to receive a disaster roaming service in an area according to the embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to disclose a method for selecting forbidden PLMN (FPLMN) and PLMN with disaster condition (PLMN-D) to receive disaster roaming service in an area. The method includes detecting, by a UE, a disaster condition in the area. Further, the method includes detecting, by the UE, a FPLMN broadcasting a plurality of PLMN-D's in the area. Further, the method includes selecting, by the UE, the at least one PLMN-D from the plurality of PLMN-D based on a predefined sequence of priority order. Further, the method includes camping, by the UE, the FPLMN corresponding to the at least one selected PLMN-D. Further, the method includes triggering, by the UE, a registration procedure on the camped FPLMN by indicating the at least one selected PLMN-D in the registration request message.

The provided method can be used to enhance the PLMN search order in disaster scenarios. Further, the provided method provides a mechanism to handle the disaster situation and decide the priority among the available networks indicating disaster roaming services (PLMN A1 (providing disaster roaming service for PLMN D1), PLMN A2 (providing disaster roaming service for PLMN D2) or PLMN A3 (providing disaster roaming service for PLMN D3)) for disaster roaming services.

In the description, the PLMN D is subject to disaster and PLMN A is alive and not subject to disaster, in the following conditions:

a) If a user equipment (UE) determines that PLMN D has "disaster condition," the UE may consider PLMN D as not allowable PLMN in automatic PLMN selection. This is applicable regardless whether PLMN D is HPLMN or any other PLMN.

b) If the UE determines that PLMN D has "disaster condition," determines that PLMN A can accept "Disaster Inbound Roamers" from PLMN D, PLMN D is not in UE's list of forbidden PLMNs and PLMN A is in UE's list of forbidden PLMNs, then in automatic PLMN selection the UE may consider the PLMN A as allowable PLMN with lowest priority (despite PLMN A being in UE's list of forbidden PLMNs).

The terms "disaster based service," "disaster service" and "disaster roaming service" are used interchangeably in this embodiment and have the same meaning.

Referring now to the drawings and more particularly to FIGS. 1 through 10, where similar reference characters denote corresponding features consistently throughout the figures, there are shown preferred embodiments.

FIG. 1 illustrates overview of a wireless network (1000) for handling a FPLMN and a PLMN with a disaster condition to receive a disaster roaming service in an area, according to the embodiments as disclosed herein. In an embodiment, the wireless network (1000) includes a UE (100) and a plurality of FPLMNs (200a-200c). Hereafter, the label of the FPLMN is 200. The UE (100) can be, for example, but not limited to a laptop, a desktop computer, a notebook, a relay device, a Device-to-Device (D2D) device, a vehicle to everything (V2X) device, a smartphone, a tablet, an immersive device, and an internet of things (IoT) device.

In an embodiment, the UE (100) is configured to detect the disaster condition in the area. In an embodiment, the UE (100) detects disaster condition when there is only FPLMNs are available in the area and FPLMNs are broadcasting at least one PLMN-D and the UE (100) is not able to receive normal services by any means for example on 3GPP access or non-3GPP access. Further, the UE (100) is configured to detect the FPLMN broadcasting the plurality of PLMN-D's in the area. Further, the UE (100) is configured to select the at least one PLMN-D from the plurality of PLMN-D based on the predefined sequence of priority order. In an embodiment, the predefined sequence of priority order comprises RPLMN, HPLMN or the highest priority EHPLMN that is available if the EHPLMN list is present, each PLMN in the "user controlled PLMN selector with access technology" data file in the SIM in the priority order, each PLMN in the "operator controlled PLMN selector with access technology" data file in a SIM in priority order or stored in the UE (100) in priority order, and a random order. The selected PLMN-D is one of a HPLMN and a VPLMN which is not part of a FPLMN list configured at the UE (100). Further, the UE (100) is configured to camp the FPLMN corresponding to the at least one selected PLMN-D. Further, the UE (100) is configured to trigger the registration procedure on the camped FPLMN by indicating the selected PLMN-D in the registration request message.

In another embodiment, the UE (100) is configured to detect the disaster condition in the area. Further, the UE (100) is configured to detect the plurality of FPLMNs (200) each of which is broadcasting at least one PLMN-D. Further, the UE (100) is configured to determine the PLMN-D with highest priority from the plurality of broadcasted PLMN-D by the FPLMN from the plurality of FPLMNs (200). Based on the predefined sequence of priority order, the UE (100) is configured to select the PLMN-D with highest priority broadcasted by the at least one FPLMN from the plurality of FPLMNs (200). Further, the UE (100) is configured to determine whether FPLMN is broadcasting selected PLMN-D and list of PLMNs to be used in disaster condition is configured by selected PLMN-D at the UE (100). In an embodiment, "the list of PLMN(s) to be used in disaster condition" is configured in the UE (100) by selected PLMN-D before disaster condition has occurred or optionally after disaster condition has occurred.

In response to determining that the FPLMN is broadcasting the selected PLMN-D and the list of PLMNs to be used in the disaster condition is not configured at the UE (100) by the selected PLMN-D or none of the FPLMNs in the list of PLMNs to be used in the disaster condition broadcast selected PLMN-D, the UE (100) is configured to select one of the FPLMN randomly as the final selected FPLMN. In response to determining that the at least one FPLMN is broadcasting the selected PLMN-D and the list of PLMNs to be used in the disaster condition is configured by the selected PLMN-D at the UE (100), the UE (100) is configured to select the FPLMN with highest priority in the list of PLMNs to be used in the disaster condition as final selected FPLMN. Further, the UE (100) is configured to camp the FPLMN corresponding to the selected PLMN-D. Further, the UE (100) is configured to trigger the registration procedure on the camped FPLMN by indicating at least one selected PLMN-D in the registration request message.

Based on the existing method, when the UE (100) has lost coverage of current serving PLMN or if the UE (100) identifies that disaster situation has occurred, and in a given area if one PLMN (PLMN A) indicates to the UE (100) (for example by broadcast) that the PLMN supports to provide disaster roaming services for multiple PLMNs (PLMN D1, PLMN D2 and PLMN D3), for which among the indicated networks (PLMN D1, PLMN D2 or PLMN D3) may, the UE (100) select and request for disaster roaming services when the UE (100) camps and registers for disaster roaming services on PLMN A is not defined as per the prior art.

The provided method provides a mechanism to handle this situation and decide the priority among the indicated networks (PLMN D1, PLMN D2 or PLMN D3) for disaster roaming services when the UE (100) selects, camps and registers on PLMN A for disaster roaming services.

Unlike to the conventional methods and systems, when the UE (100) identifies that disaster situation has occurred, and in a given area if one PLMN (PLMN A) indicates to the UE (100) (for example by broadcast) that the PLMN supports to provide disaster roaming services for multiple PLMNs (PLMN D1, PLMN D2 and PLMN D3), then the UE (100) can decide the priority among the indicated PLMNs (PLMN D1, PLMN D2 or PLMN D3) for selecting and requesting disaster roaming services on PLMN-A on the basis of the priority of the indicated PLMNs as defined below:

a) Indicated PLMNs (D1/D2/D3) are registered PLMNs;
b) Indicated PLMNs (D1/D2/D3) present in an EHPLMN with the highest priority if the equivalent home PLMN (EHPLMN) list is present, or if the indicated PLMN is a home PLMN (HPLMN) if the EHPLMN list is not present;
c) Indicated PLMN present in the user controlled PLMN selection with access technology data file in the subscriber identity module (SIM), in priority order(U-PLMN);
d) Indicated PLMN in the operator controlled PLMN selection with access technology data file in the SIM, in priority order (OPLMN); and
e) If not found in any of the above lists i.e., EHPLMN, OPLMN, UPLMN, then the indicated PLMN can be selected in a random order for example based on the signal strength.

In yet another embodiment, the UE (100) could be configured with a "PLMN priority list for disaster roaming services" (also called as list of PLMN(s) to be used in disaster condition). The "PLMN priority list for disaster roaming services" can be pre-configured in the UE (100) (ME or USIM) or updated by a home network or a last serving network. The "PLMN priority list for disaster roaming services" is in priority order which helps the UE (100) to determine for which indicated disaster PLMN may UE select and request disaster roaming services when a PLMN (PLMN A) indicates to the UE (100) (for example by broadcast) that the PLMN support to provide disaster roaming services for one or multiple PLMNs (PLMN D1, PLMN D2 and PLMN D3).

Indicated PLMN(s) not present in the "PLMN priority list for disaster roaming services" may be treated with a lower priority than the PLMN(s) present in that list for disaster roaming services and the UE (100) could select those PLMN(s) not present in this list either in random order or in the priority order as defined in Step 1 above. The UE (100) may not attempt registration for the indicated PLMN for disaster roaming services, if indicated PLMN is present in UE's forbidden PLMN list.

Once the UE (100) decides the priority of the indicated PLMNs (for disaster roaming service), the UE (100) can select and request disaster roaming services for the highest priority PLMN among the indicated PLMNs while requesting registration (via any AS or NAS Signalling) on PLMN A. If the UE (100) fails to get disaster roaming service for the highest priority indicated PLMN through PLMN A, the UE (100) could select and request disaster roaming service for second highest priority PLMN among the indicated PLMNs while registering on PLMN A and so on.

Figure 2:
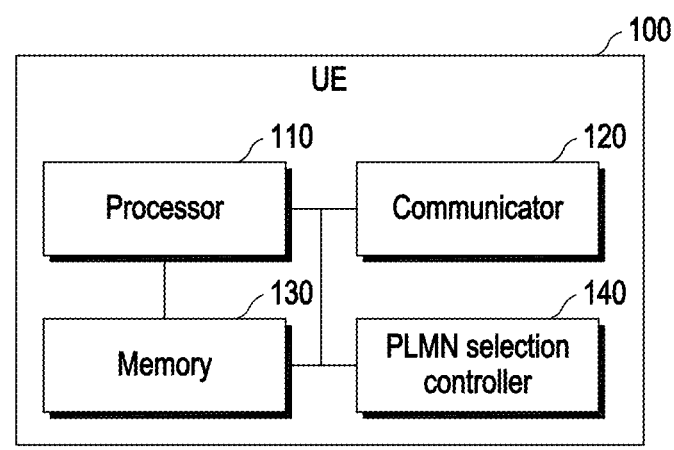
FIG. 2 illustrates various hardware components of the UE according to the embodiments of the present disclosure.

FIG. 2 illustrates various hardware components of the UE (100) according to the embodiments of the present disclosure. Further, the UE (100) includes a processor (110), a communicator (120), a memory (130), and a PLMN selection controller (140). The processor (110) is coupled with the communicator (120), the memory (130), and the PLMN selection controller (140).

In an embodiment, the PLMN selection controller (140) is configured to detect the disaster condition in the area. Further, the PLMN selection controller (140) is configured to detect the FPLMN broadcasting the plurality of PLMN-D's in the area. Further, the PLMN selection controller (140) is configured to select the at least one PLMN-D from the plurality of PLMN-D based on the predefined sequence of priority order. Further, the PLMN selection controller (140) is configured to select, camp the FPLMN corresponding to the at least one selected PLMN-D. Further, the PLMN selection controller (140) is configured to trigger the registration procedure on the camped FPLMN by indicating the selected PLMN-D in the registration request message.

In another embodiment, the PLMN selection controller (140) is configured to detect the disaster condition in the area. Further, the PLMN selection controller (140) is configured to detect the plurality of FPLMNs (200) each of which is broadcasting at least one PLMN-D. Further, the PLMN selection controller (140) is configured to determine the PLMN-D with highest priority from the plurality of broadcasted PLMN-D by the FPLMN from the plurality of FPLMNs (200). Based on the predefined sequence of priority order, the PLMN selection controller (140) is configured to select the PLMN-D with highest priority broadcasted by the at least one FPLMN from the plurality of FPLMNs (200). Further, the PLMN selection controller (140) is configured to determine whether FPLMN is broadcasting selected PLMN-D and list of PLMNs to be used in disaster condition is configured by selected PLMN-D at the UE (100).

In response to determining that the FPLMN is broadcasting the selected PLMN-D and the list of PLMNs to be used in the disaster condition is not configured at the UE (100) by the selected PLMN-D or FPLMN broadcasting selected PLMN-D is not part of the list of PLMNs to be used in the disaster condition, the PLMN selection controller (140) is configured to select one of the FPLMN randomly as the final selected FPLMN. In response to determining that the at least one FPLMN is broadcasting the selected PLMN-D and the list of PLMNs to be used in the disaster condition is configured by the selected PLMN-D at the UE (100), the PLMN selection controller (140) is configured to select the FPLMN with highest priority in the list of PLMNs to be used in the disaster condition as final selected FPLMN. Further, the PLMN selection controller (140) is configured to camp the FPLMN corresponding to the selected PLMN-D. Further, the PLMN selection controller (140) is configured to trigger the registration procedure on the camped FPLMN by indicating at least one selected PLMN-D in the registration request message.

The PLMN selection controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 2 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the present disclosure. One or more components can be combined together to perform same or substantially similar function in the UE (100).

Figure 3:
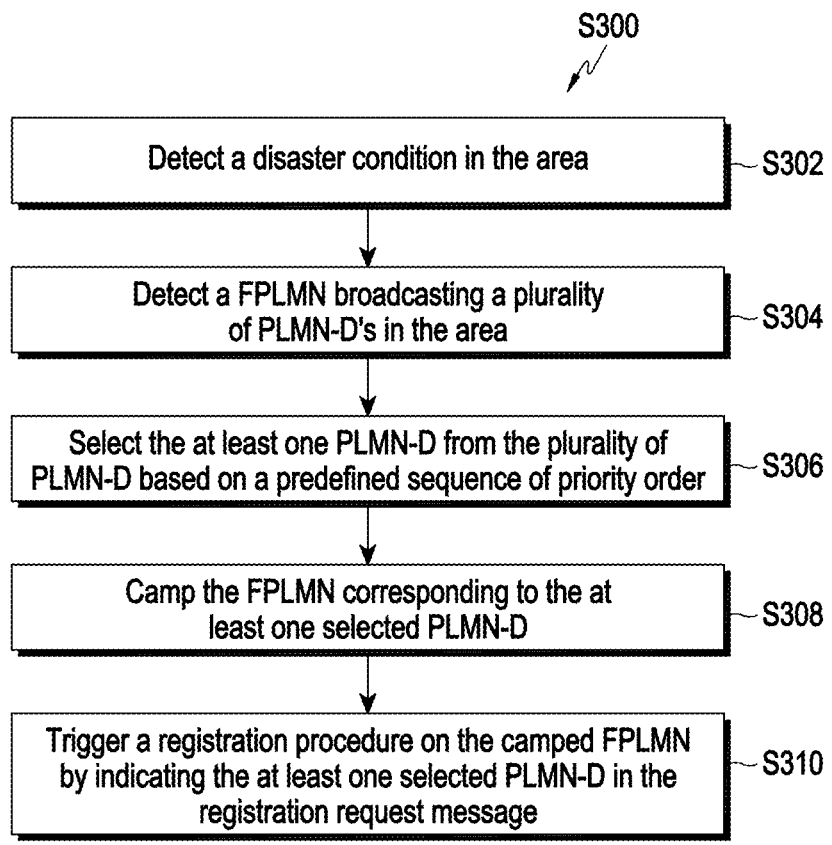
FIG. 3, FIG. 4A, and FIG. 4B are illustrating methods for the FPLMN and the PLMN with the disaster condition to receive the disaster roaming service in an area according to the embodiments of the present disclosure.
Figure 4A:
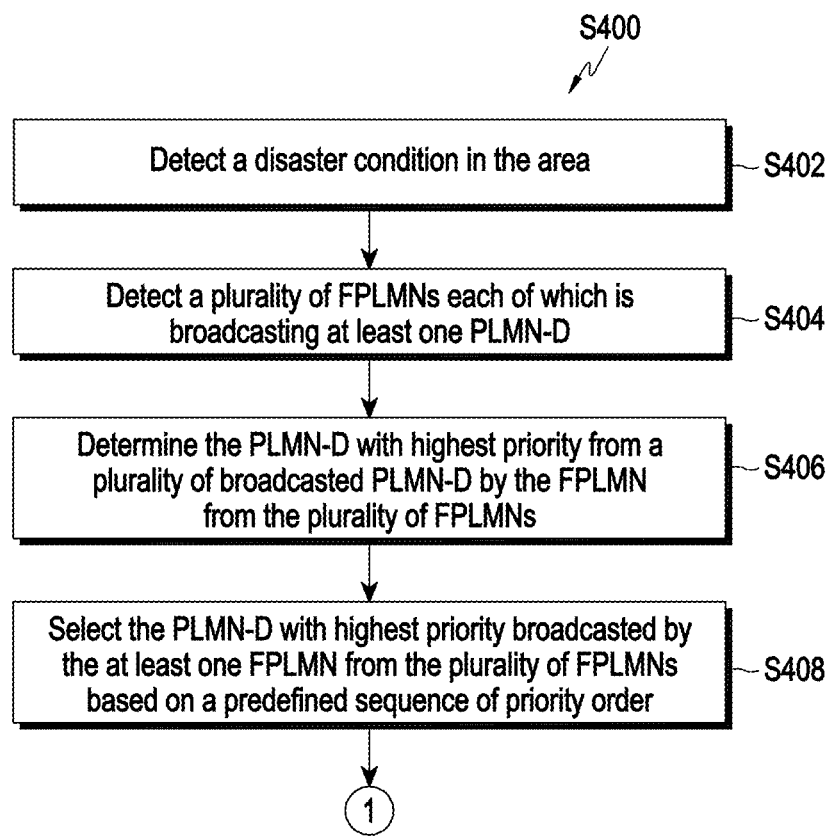
Figure 4B:
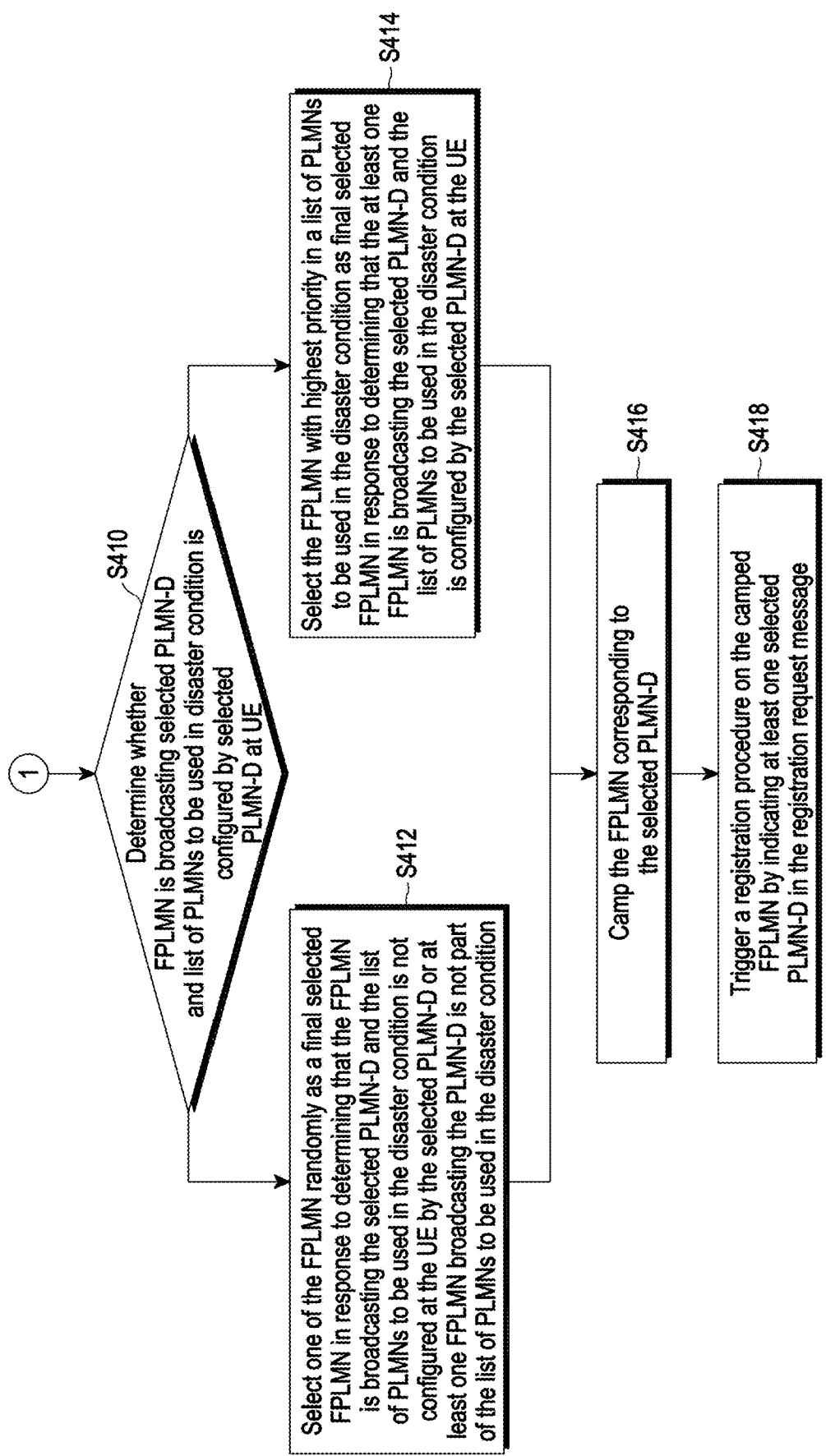

FIG. 3, FIG. 4A and FIG. 4B are flow charts (S300 and S400) illustrating methods for selecting the FPLMN and the PLMN with the disaster condition to receive the disaster roaming service in the area according to the embodiments of the present disclosure.

As shown in the FIG. 3, the operations (S302-S310) are performed by the PLMN selection controller (140). At S302, the method includes detecting the disaster condition in the area. At S304, the method includes detecting the FPLMN broadcasting the plurality of PLMN-D's in the area. At S306, the method includes selecting the at least one PLMN-D from the plurality of PLMN-D based on the predefined sequence of priority order. At S308, the method includes camping on the FPLMN corresponding to the at least one selected PLMN-D. At S310, the method includes triggering the registration procedure on the camped FPLMN by indicating the selected PLMN-D in the registration request message to the AMF of the FPLMN.

As shown in the FIGS. 4A and 4B, the operations (S402-S418) are performed by the PLMN selection controller (140). At S402, the method includes detecting the disaster condition in the area. At S404, the method includes detecting the plurality of FPLMNs (200) each of which is broadcasting at least one PLMN-D. At S406, the method includes determining the PLMN-D with highest priority from the plurality of broadcasted PLMN-D by the FPLMN from the plurality of FPLMNs (200). At S408, the method includes selecting the PLMN-D with highest priority broadcasted by the at least one FPLMN from the plurality of FPLMNs (200) based on the predefined sequence of priority order. At S410, the method includes determining whether FPLMN is broadcasting selected PLMN-D and list of PLMNs to be used in disaster condition is configured by selected PLMN-D at the UE (100).

At S412, the method includes selecting one of the FPLMN randomly as the final selected FPLMN in response to determining that the FPLMN is broadcasting the selected PLMN-D and the list of PLMNs to be used in the disaster condition is not configured at the UE (100) by the selected PLMN-D or at least one FPLMN broadcasting the PLMN-D is not part of the list of PLMNs to be used in the disaster condition. At S414, the method includes selecting the FPLMN with highest priority in the list of PLMNs to be used in the disaster condition as final selected FPLMN in response to determining that the at least one FPLMN is broadcasting the selected PLMN-D and the list of PLMNs to be used in the disaster condition is configured by the selected PLMN-D at the UE (100). At S416, the method includes camping the FPLMN corresponding to the selected PLMN-D. At S418, the method includes triggering the registration procedure on the camped FPLMN by indicating at least one selected PLMN-D in the registration request message.

Figure 5:
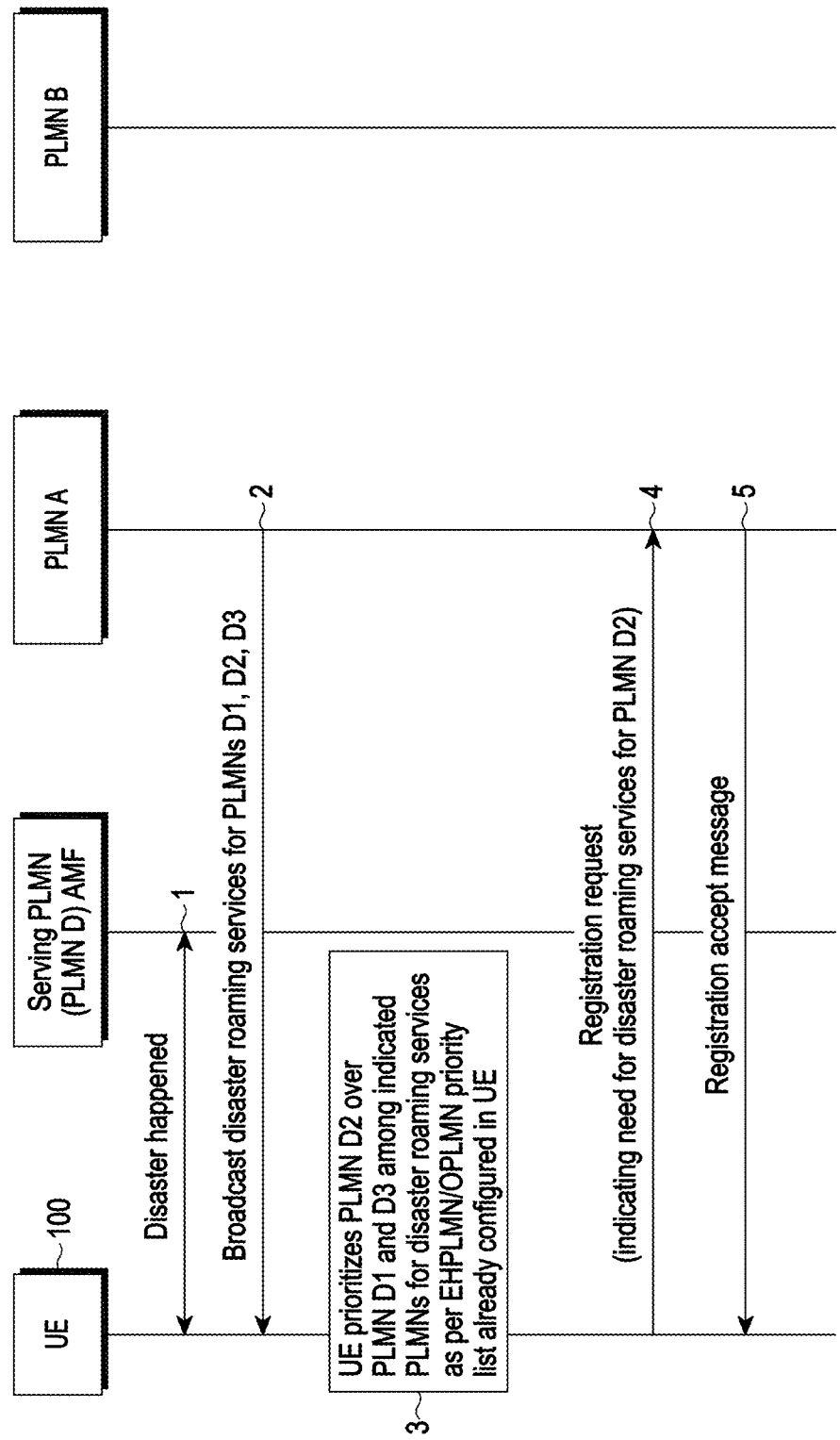
FIG. 5 is an example signalling diagram illustrating a scenario in which a serving PLMN is subject to disaster and PLMN A is alive and not subject to disaster according to the embodiments of the present disclosure.

FIG. 5 is an example signalling diagram illustrating a scenario in which a serving PLMN is subject to disaster and PLMN A is alive and not subject to disaster according to the embodiments of the present disclosure.

Referring to the FIG. 5 considering a provided method and illustrating the scenario for which PLMN (PLMN D1, PLMN D2 or PLMN D3), the UE (100) may select and request for disaster roaming services if a PLMN (PLMN A) is broadcasting that the PLMN is providing disaster roaming services for PLMN D1, PLMN D2 and PLMN D3. In the description, the serving PLMN (PLMN D) is subject to disaster and PLMN A is alive and not subject to disaster. The PLMN A indicates that the PLMN can provide disaster roaming services for PLMNs D1, D2 and D3. OPLMN priority order is PLMN D2>PLMN D1>PLMN D3.

Referring to the FIG. 5, at step 1, the disaster happened is between the UE (100) and the serving PLMN (i.e., PLMN D). At step 2, the PLMN A indicates in the broadcast that disaster roaming services for the PLMNs D1, D2, D3 is supported to the UE (100). At step 3, the UE (100) prioritizes the PLMN D2 over the PLMN D1 and D3 among indicated PLMNs for the disaster roaming services as per EHPLMN/OPLMN priority list already configured in the UE (100). At step 4, the UE (100) sends the registration request (indicating need for disaster roaming services for PLMN D2) to the PLMN A. At step 5, the PLMN A sends the registration accept message to the UE (100).

Figure 6:
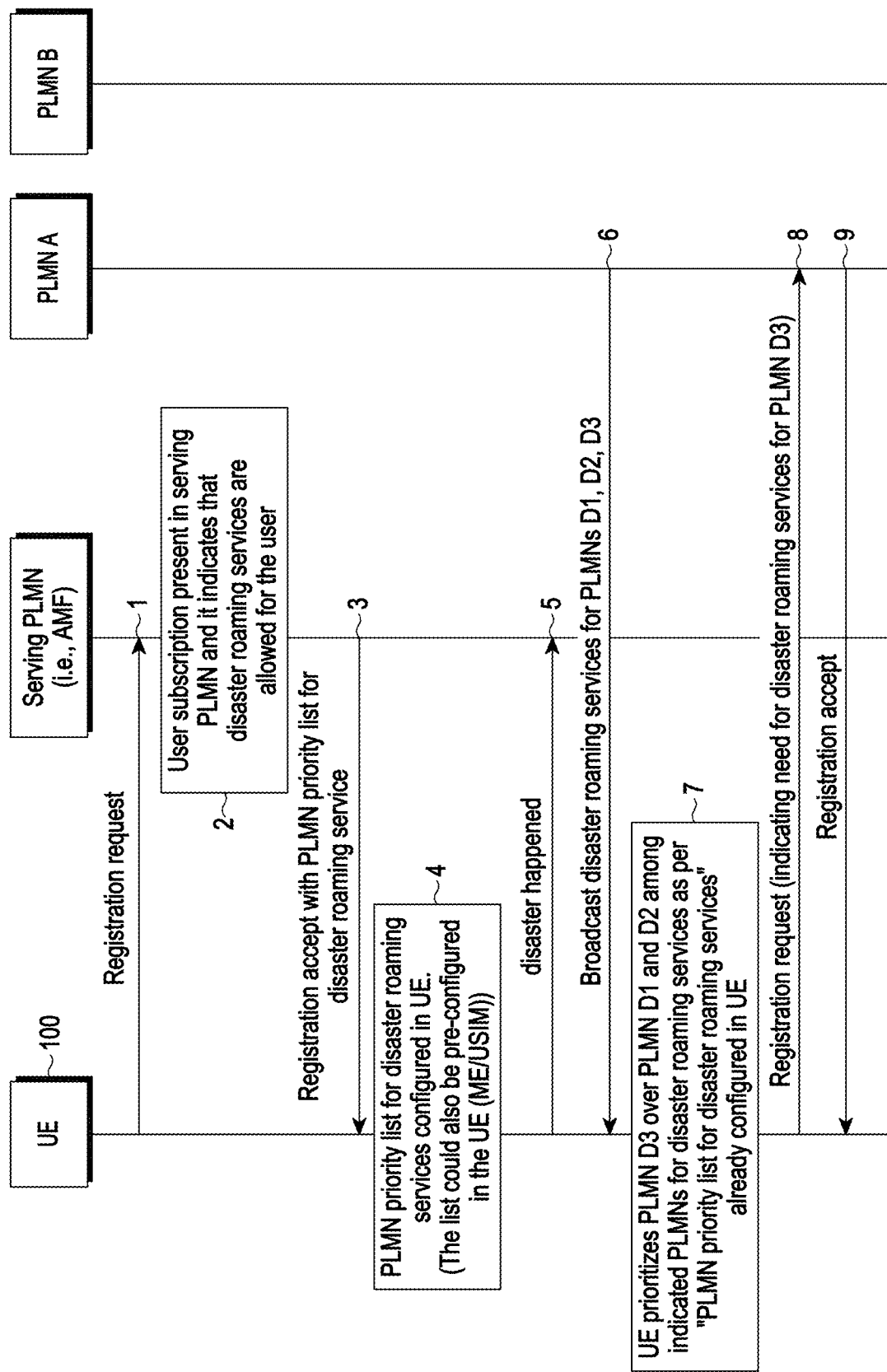
FIG. 6 is an example signalling diagram illustrating a scenario of a PLMN priority list for disaster roaming services according to the embodiments of the present disclosure.

FIG. 6 is an example signalling diagram illustrating a scenario of the PLMN priority list for the disaster roaming services according to the embodiments of the present disclosure.

Referring to the FIG. 6 consider a provided method, illustrates the scenario for which PLMN (PLMN D1, PLMN D2 or PLMN D3), the UE (100) may select and request for disaster roaming services if a PLMN (PLMN A) is broadcasting that the PLMN is providing disaster roaming services for PLMN D1, PLMN D2 and PLMN D3. In the description, the serving PLMN is subject to disaster and PLMN A is alive and not subject to disaster. PLMN A indicates that the PLMN can provide disaster roaming services for PLMNs D1, D2 and D3. PLMN priority order for disaster services as per "PLMN priority list for disaster roaming services" is PLMN D3>PLMN D1>PLMN D2.

For which PLMN-A(s) (PLMN A1, PLMN A2 or PLMN A3) the UE (100) may select and request for disaster roaming services if there are more than one PLMN-A(s) (PLMN A1, PLMN A2 and PLMN A3) which are alive and indicating (for example by broadcast) that more than one PLMN-A(s) are providing disaster roaming services for different PLMN-D(s) i.e. PLMN D1, PLMN D2 and PLMN D3 respectively (i.e. PLMN A1 is providing disaster roaming services for PLMN D1, PLMN A2 is providing disaster roaming services for PLMN D2 and PLMN A3 is providing disaster roaming services for PLMN D3).

When the UE (100) has lost coverage of current serving PLMN or if the UE (100) identifies that disaster situation has occurred, and in a given area if more than one PLMN-A(s) (PLMN A1, PLMN A2 and PLMN A3) are alive and indicate to the UE (100) (for example by broadcast) that more than one PLMN-A(s) support to provide disaster roaming services for different PLMN-D(s) i.e., PLMN D1, PLMN D2 and PLMN D3 respectively. On which among the available networks (PLMN A1 or PLMN A2 or PLMN A3) may UE (100) select, try and register for disaster roaming services is not defined as per the prior art.

The provided method provides a mechanism to handle this situation and decide the priority among the available networks providing disaster roaming services (PLMN A1 (disaster service for PLMN D1), PLMN A2 (disaster service for PLMN D2) or PLMN A3 (disaster service for PLMN D3)) for disaster roaming services.

When the UE (100) identifies that disaster situation has occurred, and in a given area if more than one PLMN-A(s) (PLMN A1, PLMN A2 and PLMN A3) indicate to the UE (100) (for example by broadcast) that more than one PLMN-A(s) support to provide disaster roaming services for different PLMN-D(s) (PLMN D1, PLMN D2 and PLMN D3 respectively), then the UE (100) can decide the priority among the available PLMN-A(s) (A1 or A2 or A3) to select and for requesting disaster roaming services on the basis of the priority of the indicated PLMN-D(s) (D1/D2/D3) for which disaster roaming services are being provided as defined below:

a) PLMN-A(s) (A1/A2/A3), having indicated RPLMN (registered PLMN);
b) PLMN-A(s) (A1/A2/A3), having indicated PLMN-D(s)(D1/D2/D3) present in EHPLMN (i.e., PLMN D is expected to be present in EHPLMN list), with the highest priority (of PLMN-D) if the EHPLMN list is present, or if the indicated one of the PLMN-D is the HPLMN if the EHPLMN list is not present;
c) PLMN-A(s) (A1/A2/A3), having indicated PLMN-D(s)(D1/D2/D3) present in the User Controlled PLMN Selection with Access Technology data file in the SIM, in priority order. The priority order will be UPLMN;
d) PLMN-A(s) (A1/A2/A3), having indicated PLMN-D(s) (D1/D2/D3) in the Operator Controlled PLMN Selection with Access Technology data file in the SIM, in priority order. The priority order will be OPLMN; and
e) If indicated PLMN-D(s) (D1/D2/D3) is not found in any of the above lists i.e., EHPLMN list, UPLMN list, OPLMN list, then PLMN-A(s) (A1/A2/A3) can be selected in a random order for example based on the signal strength.

In yet another embodiment, UE (100) could be configured with a "PLMN priority list for disaster roaming services." The "PLMN priority list for disaster roaming services" can be pre-configured in the UE (ME or USIM) or updated by HPLMN/EHPLMN or home network of the UE (100). The "PLMN priority list for disaster roaming services" is in priority order of PLMN-A(s) which helps the UE (100) to determine on which available PLMN-A(s) may UE select and request for disaster roaming services when more than one PLMN-A(s) (PLMN A1, A2, A3) indicate to the UE(for example by broadcast) that more than one PLMN-A(s) support to provide disaster roaming services for different PLMN-D(s) (PLMN D1, PLMN D2 and PLMN D3 respectively).

The priority of PLMN-A(s) in "PLMN priority list for disaster roaming services" is decided on the basis of the priority of the PLMN-D(s) by the HPLMN/EHPLMN or the VPLMN. PLMN-A(s) not present in the "PLMN priority list for disaster services" may be treated with a lower priority than the PLMN-A(s) present in that list for disaster roaming services and the UE (100) may select those PLMN(s) not present in this list either in random order or in the priority order as defined in Step 1 above. The UE (100) may not attempt registration on any available PLMN-A(s) for disaster roaming services, if the UE indicates disaster roaming service for a PLMN which is present in UE's forbidden PLMN list. Further, the PLMN-A list may be provided as per the priority of PLMN-D by the HPLMN.

Once the UE (100) decides the priority of the available PLMN-A(s) (A1/A2/A3) (for disaster roaming service), the UE (100) can select, camp and request disaster roaming services from the highest priority PLMN among the available PLMN-A(s) (A1/A2/A3) and try to select, camp and register (via any AS or NAS Signalling) on it. If the UE (100) fails to get disaster roaming service from the highest priority PLMN, the UE (100) could select and request disaster roaming service from second highest priority PLMN among the available PLMN-A(s) (A1/A2/A3) and register on the highest priority PLMN and so on.

Referring to the FIG. 6, at step 1, the UE (100) sends the registration request to the serving PLMN. At step 2, the user subscription present in the serving PLMN and the serving PLMN indicates that the disaster roaming services are allowed for the user. At step 3, the serving PLMN sends the registration accept or any other non access stratum (NAS) message with PLMN priority list for the disaster roaming services (also called as list of PLMNs to be used during disaster condition) to the UE (100). At step 4, the PLMN priority list for disaster roaming services configured in the UE (100). The list could also be pre-configured in the UE (100) at ME or USIM.

At step 5, the disaster happened is between the UE (100) and the serving PLMN. At step 6, the PLMN A sends the broadcast disaster roaming services for the PLMNs D1, D2, and D3 to the UE (100). At step 7, the UE (100) prioritizes the PLMN D3 over the PLMN D1 and D2 among indicated PLMNs for the disaster roaming services as per PLM priority list for disaster roaming services already configured in the UE (100). At step 8, the UE (100) sends the registration request (indicating need for disaster roaming services for PLMN D3) to the PLMN A. At step 9, the PLMN A sends the registration accept message to the UE (100).

Figure 7:
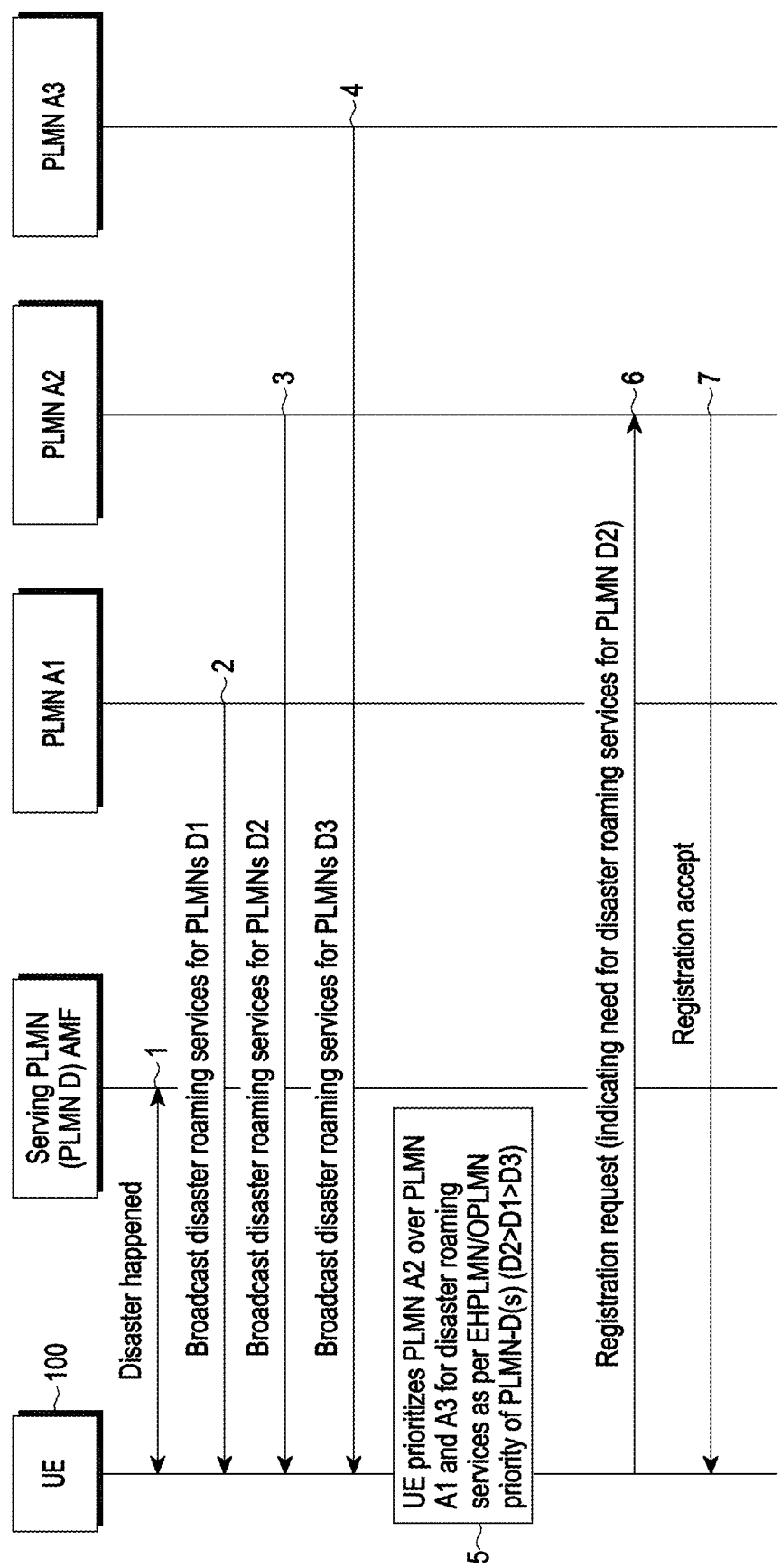
FIG. 7 is an example signalling diagram illustrating a scenario of on which PLMN A may UE select and request for disaster roaming services if there are more than one PLMN A (A1/A2/A3) which are alive and not subject to disaster according to the embodiments of the present disclosure.

FIG. 7 is an example signalling diagram illustrating a scenario in which a PLMN A may UE request for disaster roaming services if there is more than one PLMN A according to the embodiments of the present disclosure.

Referring to the FIG. 7 consider a provided method, in the description, which FPLMNs like PLMN-A(s) (PLMN A1, PLMN A2 or PLMN A3), the UE (100) may select and request for disaster roaming services if there are more than one PLMN-A(s) (PLMN A1, PLMN A2 and PLMN A3) broadcasting that more than one PLMN-A(s) are providing disaster roaming services for different PLMN-D(s) i.e. PLMN D1, PLMN D2 and PLMN D3 respectively (i.e. PLMN A1 is providing disaster roaming services for PLMN D1, PLMN A2 is providing disaster roaming services for PLMN D2 and PLMN A3 is providing disaster roaming services for PLMN D3). Further, in the description, the serving PLMN (PLMN D) is subject to disaster and PLMN-A(s) (A1/A2/A3) are alive and not subject to disaster. PLMN-A(s) (A1/A2/A3) indicate that the PLMN-A(s) can provide disaster roaming services for PLMN-D(s) (D1, D2 and D3 respectively). Operator (OPLMN) priority order is PLMN D2>PLMN D1>PLMN D3.

Referring to the FIG. 7, at step 1, the disaster happened is between the UE (100) and the serving PLMN. At step 2, the PLMN A1 sends the broadcast disaster roaming services for the PLMNs D1 to the UE (100). At step 3, the PLMN A2 sends the broadcast disaster roaming services for the PLMNs D2 to the UE (100). At step 4, the PLMN A3 sends the broadcast disaster roaming services for the PLMNs D3 to the UE (100). At step 5, the UE (100) prioritizes the PLMN A2 over the PLMN A1 and PLMN A3 for the disaster roaming services as per EHPLMN/OPLMN Priority of PLMN-D(s). At step 6, the UE (100) sends the registration request (indicating need for disaster roaming services for PLMN D2) to the PLMN A2. At step 7, the PLMN A2 sends the registration accept message to the UE (100).

Figure 8:
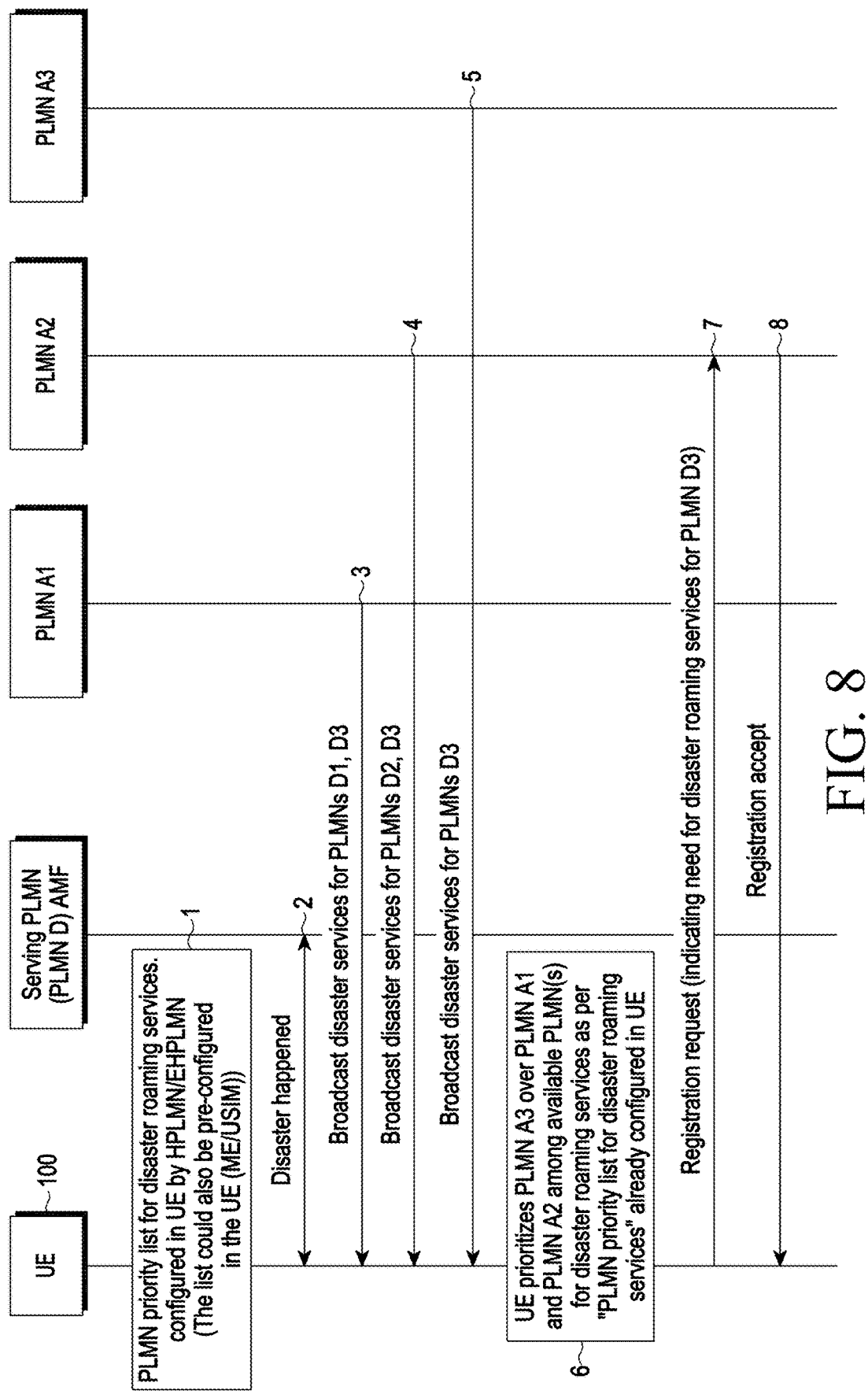
FIG. 8 is an example signalling diagram illustrating a scenario in which a serving PLMN is subject to disaster and more than one PLMN A(A1/A2/A3) are alive and not subject to disaster according to the embodiments of the present disclosure.

FIG. 8 is an example signalling diagram illustrating in which a serving PLMN is subject to disaster and PLMN As are alive and not subject to disaster according to the embodiments of the present disclosure.

Referring to the FIG. 8, considering a provided method and illustrating a scenario for which PLMN-A(s) (PLMN A1, PLMN A2 or PLMN A3), the UE may select and request for disaster roaming services if there are more than one PLMN-A(s) (PLMN A1, PLMN A2 and PLMN A3) broadcasting that more than one PLMN-A(s) are providing disaster roaming services for different PLMN-D(s) i.e. PLMN D1, PLMN D2 and PLMN D3 respectively (i.e. PLMN A1 is providing disaster roaming services for PLMN D1, PLMN A2 is providing disaster roaming services for PLMN D2 and PLMN A3 is providing disaster roaming services for PLMN D3).

In the description, serving PLMN (PLMN D) is subject to disaster, and has configured "PLMN priority list for disaster roaming services" in the UE before disaster condition has occurred and PLMN-A(s) (A1/A2/A3) are alive and not subject to disaster. PLMN-A(s) (A1/A2/A3) indicate that the PLMN-A(s) can provide disaster roaming services for PLMN-D(s) (D1, D2 and D3 respectively). PLMN-A(s) priority order for disaster roaming services as per "PLMN priority list for disaster roaming services" is PLMN A3>PLMN A1>PLMN A2 (On basis of PLMN-D(s) priority order as configured by HPLMN/EHPLMN or the VPLMN).

In the conventional automatic PLMN selection in disaster scenario, followings are as follows:
a) If the serving network (PLMN D) faces disaster situation, then the UE (100) does a full band scan;
b) If the other network (PLMN A) which can provide service to disaster UE's is in UE's forbidden list, then as per current implementation it will be tried in the end only after the UE has exhausted all other PLMN's; and c) However, this may lead to delay in acquiring service as currently available PLMN's may not provide service to the UE (100).

The provided method is to enhance the PLMN search order in disaster scenarios.

Referring to the FIG. 8, at step 1, the PLMN priority list for the disaster roaming services is configured in the UE (100) by the serving PLMN. The list could also be pre-configured in the UE (100) (i.e., ME/USIM). At step 2, the disaster happened is between the UE (100) and the serving PLMN(PLMN-D3). At step 3, the PLMN A1 sends the broadcast disaster roaming services for the PLMNs D1, D3 to the UE (100). At step 4, the PLMN A2 sends the broadcast disaster roaming services for the PLMNs D2, D3 to the UE (100). At step 5, the PLMN A3 sends the broadcast disaster roaming services for the PLMNs D3 to the UE (100). At step 6, the UE (100) prioritizes the PLMN A3 over the PLMN A1 and the PLMN A2 among available PLMN(s) for the disaster roaming services as per "PLMN priority list for disaster roaming services" already configured in the UE (100). At step 7, the UE (100) sends the registration request (indicating need for disaster roaming services for PLMN D3) to the PLMN A3. At step 8, the PLMN A3 sends the registration accept message to the UE (100).

Figure 9:
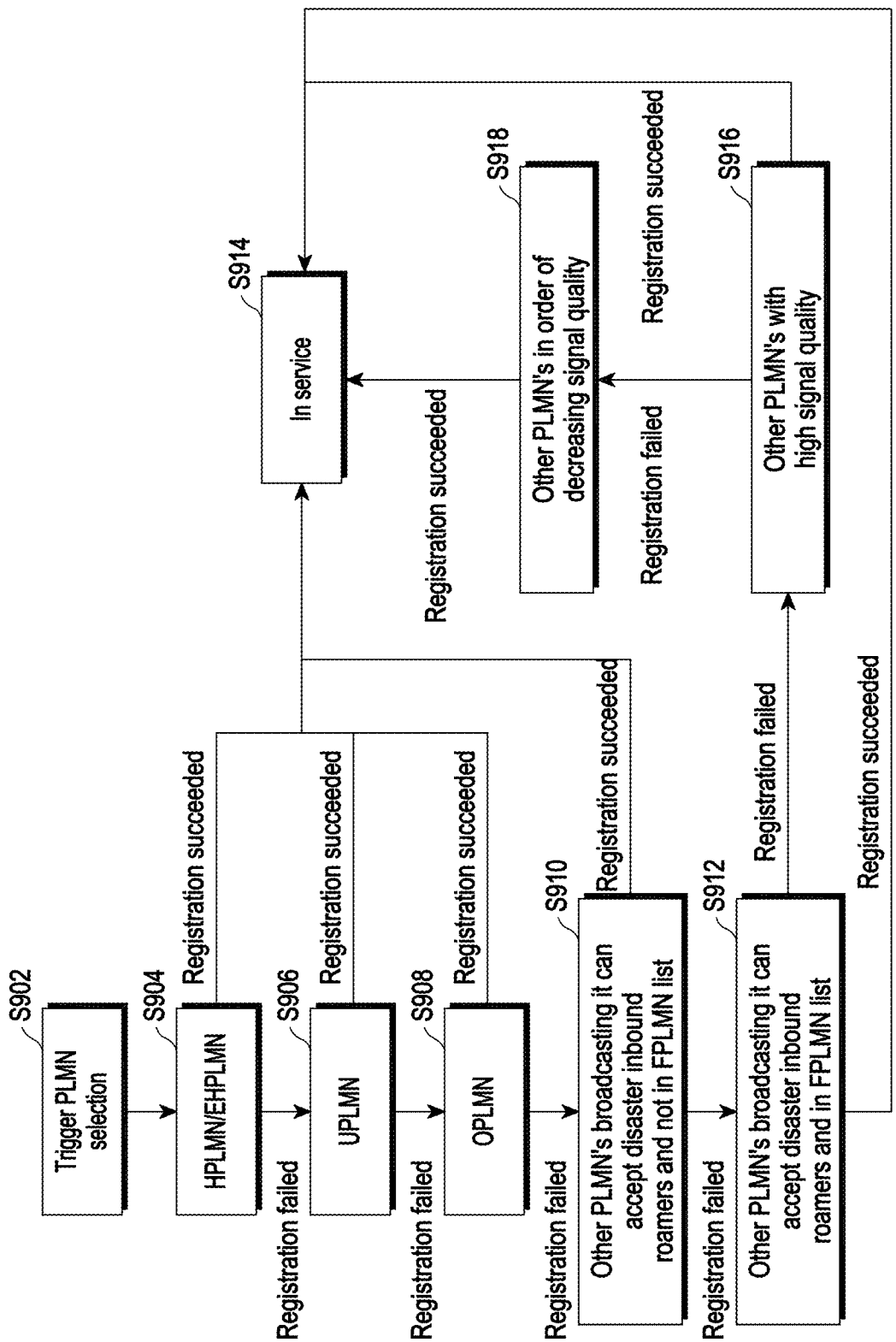
FIG. 9 is an example flow chart illustrating an automatic PLMN selection in a disaster scenario according to the embodiments of the present disclosure.

FIG. 9 is an example flow chart illustrating an automatic PLMN selection in the disaster scenario according to the embodiments of the present disclosure.

Referring to the FIG. 9, consider a provided method, if the serving network(PLMN D) faces disaster situation, then the UE (100) may prioritize the available PLMN's in the following order. The PLMN search order may be as below:

either the HPLMN (if the EHPLMN list is not present or is empty) or the highest priority EHPLMN that is available (if the EHPLMN list is present):
   a) each PLMN/access technology combination in the "user controlled PLMN selector with access technology" data file in the SIM (in priority order);
   b) each PLMN/access technology combination in the "Operator Controlled PLMN Selector with Access Technology" data file in the SIM (in priority order) or stored in the ME (in priority order);
   c) PLMN's which are broadcasting that the PLMN can provide service to disaster inbound roamers and are not in FPLMN list in order of decreasing signal quality;
   d) PLMN's which are broadcasting that the PLMN can provide service to disaster inbound roamers and are in FPLMN list in order of decreasing signal quality;
   e) other PLMN/access technology combinations with received high quality signal in random order; and
   f) other PLMN/access technology combinations in order of decreasing signal quality.

In the conventional methods and systems, followings are the steps of faster service acquisition during disaster scenario:
   a) If the serving network (PLMN D) faces disaster situation, then the UE (100) does a full band scan;
   b) However, it may be possible that while doing full band scan, the UE (100) is able to find some PLMN which is broadcasting support for disaster inbound roamers;
   c) In that case the UE (100) may not need to complete the full band scan since the UE has already found one PLMN which supports Disaster inbound roamers;
   d) Without optimization, the UE (100) will continue to search all the remaining bands even though the UE has found one PLMN with disaster support; and
   e) This will unnecessarily delay the time taken to find service in disaster situation.

Referring to FIG. 9, at S902, the UE (100) triggers the PLMN selection. At S904, the UE (100) selects the HPLMN/EHPLMN. If the UE (100) selects the HPLMN/EHPLMN then, at S914, the UE (100) starts the service. If the UE (100) does not select the HPLMN/EHPLMN then, at S906, the UE (100) selects the UPLMN. If the UE (100) selects the UPLMN then, at S914, the UE (100) starts the service. If the UE (100) does not select the UPLMN then, at S908, the UE (100) selects the OPLMN. If the UE (100) selects the OPLMN then, at S914, the UE (100) starts the service.

If the UE (100) does not select the OPLMN then, at S910, the UE (100) selects the PLMN other PLMN's broadcasting, where the other PLMN's can accept disaster inbound roamers and not in FPLMN list. If the UE (100) selects the PLMN other PLMN's broadcasting where the other PLMN's can accept disaster inbound roamers and not in FPLMN list then, at S914, the UE (100) starts the service.

If the UE (100) does not select the PLMN other PLMN's broadcasting then, at the UE (100) selects other PLMN's broadcasting, where the other PLMN's can accept disaster inbound roamers and is in the FPLMN list. If the UE (100) selects other PLMN's broadcasting, where the other PLMN's can accept disaster inbound roamers and is in the FPLMN list then, at S914, the UE (100) starts the service.

If the UE (100) does not select other PLMN's broadcasting, where the other PLMN's can accept disaster inbound roamers and is in the FPLMN list then, at S916, the UE (100) selects the other PLMN's with high signal quality. If the UE (100) selects the other PLMN's with high signal quality then, at S914, the UE (100) starts the service. If the UE (100) does not select the other PLMN's with the high signal quality then, at S918, the UE (100) selects the other PLMN's in order of decreasing signal quality.

Figure 10:
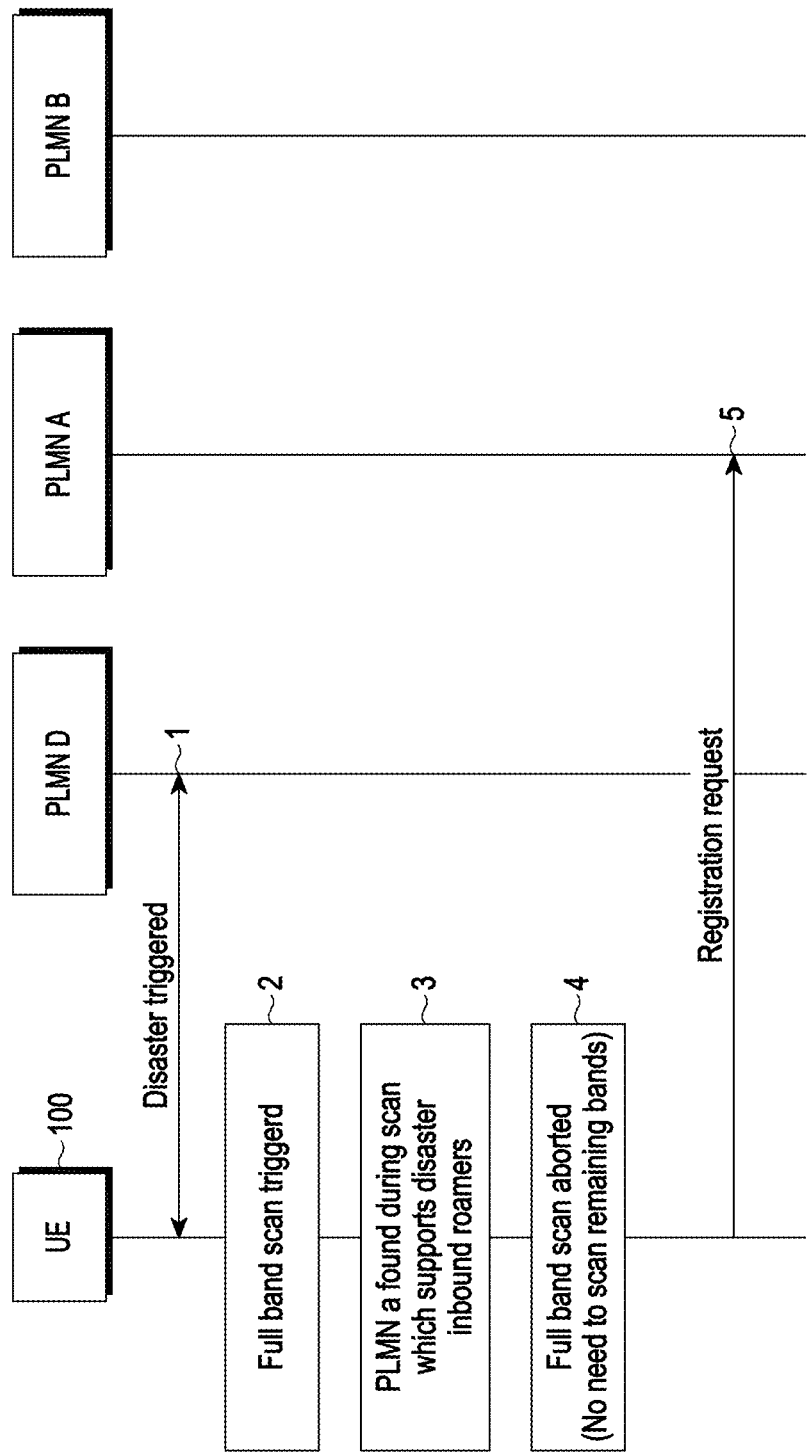
FIG. 10 is an example signalling diagram illustrating a scenario of faster service acquisition during the disaster situation according to the embodiments of the present disclosure.

FIG. 10 is an example signalling diagram illustrating a scenario of faster service acquisition during the disaster situation according to the embodiments of the present disclosure.

Unlike to the conventional methods and systems, referring to the FIG. 10 consider a provided method, is having following steps:
   a) If the serving network (PLMN D) faces disaster situation, then the UE (100) does a full band scan;
   b) However, it may be possible that while doing full band scan, the UE (100) is able to find some PLMN which is broadcasting support for disaster inbound roamers;
   c) In that case the UE (100) may abort the full band scan and directly try to camp on that particular cell on which disaster is supported; and
   d) In this way the UE (100) will find service much faster during disaster situation.

Referring to the FIG. 10, at step 1, the disaster is happened between the UE (100) and the PLMN D. At step 2, the full band scan is triggered at the UE (100). At step 3, the PLMN A is found during the scan which supports disaster inbound roamers. At step 4, the full band scan is aborted (i.e., no need to scan remaining bands). At step 5, the UE (100) sends the registration request to the PLMN A.

Further, in the description, the PLMN D is subject to disaster and PLMN A is alive and not subject to disaster and providing services to disaster affected UE's of PLMN D. PLMN B is random PLMN available in the same region which is not providing services to disaster inbound roamers.

In one example of PLMN selection, which PLMN A the UE (100) may select and request for disaster roaming services if there are multiple PLMN-A(s) (For example—PLMN A1, PLMN A2, PLMN A3 etc.) broadcasting that the multiple PLMN-A(s) are providing disaster roaming services for either same PLMN D or different PLMN-D(s) (For example—PLMN A1 broadcasting disaster roaming services for PLMN D1, PLMN A2 broadcasting disaster roaming services for PLMN D2, PLMN A3 broadcasting disaster roaming services for PLMN D3 etc.).

When the UE (100) has lost coverage of current serving PLMN D or if the UE (100) identifies that disaster situation has occurred for PLMN D, and in a given area if more than one PLMN A (PLMN A1, PLMN A2, PLMN A3 etc.) indicate to the UE (100) (for example by broadcast) that more than one PLMN A support to provide disaster roaming services for either same PLMN D or multiple PLMN-D(s) (PLMN D1, PLMN D2 and PLMN D3), which among the available networks (PLMN A1, PLMN A2 or PLMN A3) may UE (100) select and request for disaster roaming services when the UE (100) camps and registers for disaster roaming services is not defined as per the prior art.

The provided method provides a mechanism to handle this situation and decide the priority among the available networks (PLMN A1, PLMN A2 or PLMN A3) for disaster roaming services when the UE (100) selects, camps and registers for the disaster roaming services.

When the UE (100) identifies that disaster situation has occurred, and in a given area if one PLMN (i.e., PLMN A) or more than one PLMN(s) (PLMN A(s) for example PLMN A1, PLMN A2, PLMN A3 etc.) are alive and indicate to the UE (100) (for example by broadcast) that more than one PLMN(s) support to provide disaster roaming services for either one PLMN (PLMN D) or more than one PLMN(s) (PLMN D(s) for example PLMN D1, PLMN D2, PLMN D3 etc.), then the UE (100) may use the following procedures for PLMN selection.

In one example of procedure for the PLMN selection, the UE (100) could be configured with a "disaster roaming PLMN list" including a list of prioritized PLMNs which the UE (100) may select and request for disaster roaming services when no other PLMNs (which are not a part of UE's forbidden PLMN list) are available for the UE (100) in that area. The "disaster roaming PLMN list" could be:
  a. pre-configured in the UE (100) (ME or USIM),
  b. updated in the UE (100) by the home network (through any NAS/AS signalling),
  c. updated in the UE (100) by the serving network (through any NAS/AS signalling) (before the disaster condition applies), and
  d. updated in the UE (100) by the Network (Home/Serving) using steering of roaming procedure or UE parameter update procedure or like so; and In one example of procedure for the PLMN selection, whenever the UE (100) determines that disaster situation has occurred for UE's registered PLMN (PLMN D) and if in a given area, there are no allowable PLMNs (PLMNs which are not a part of UE's forbidden PLMN list) available and if there are one or more PLMN A(s) (PLMN(s) which are part of UE's forbidden PLMN list) which are alive and indicating to the UE (100) that PLMNs support to provide disaster roaming services, the UE (100) may prioritize the PLMN A(s) as following examples.

In one example, the UE (100) may first prioritize those PLMN A(s) which are alive and indicating the disaster roaming services for the PLMN on which UE (100) was last registered (For example—PLMN D in this case) for selecting and requesting disaster roaming services for PLMN D.

In one example, if there are more than one available PLMN-A(s) (PLMN A1, PLMN A2 and PLMN A3) which indicate to the UE (100) (for example by broadcast) that more than one available PLMN-A(s) support to provide disaster roaming services for PLMN D, then the UE (100) can decide the priority among the available PLMN-A(s) (A1 or A2 or A3) to select and for requesting disaster roaming services for the PLMN D on the basis of the priority of the available PLMN-A(s) (A1/A2/A3) in "disaster roaming PLMN list" configured in the UE (100) (for example—the UE (100) may prioritize and select PLMN-A(s) in order A1>A2>A3 for requesting disaster roaming services for PLMN D if priority of PLMN-A(s) in "disaster roaming PLMN list" is in order A1>A2>A3).

In one example, if UE (100) does not find any available PLMN-A(s) (which indicate to provide disaster roaming services for PLMN D) in "disaster roaming PLMN list," the UE (100) can prioritize and select the PLMN-A(s) indicating disaster roaming services for PLMN D for requesting disaster roaming services for PLMN D based on:
  a) Select any of the PLMN-A(s) indicating disaster roaming services for PLMN D in random order (for example based on the signal strength etc.), and
  b) Select any of the PLMN-A(s) indicating disaster roaming services for PLMN D based on UE implementation.

In one example, if the available PLMN-A(s) (PLMN A1, PLMN A2 and PLMN A3) does not indicate disaster roaming services for UE's last registered PLMN (PLMN D) and rather indicate to provide disaster roaming services for other PLMN-D(s) (for example—PLMN D1, PLMN D2, PLMN D3 etc.), then the UE (100) may prioritize and select PLMN-A(s) (A1/A2/A3) for requesting disaster roaming services on the basis of the priority of the indicated PLMN-D(s) (D1/D2/D3) for which disaster roaming services are being provided as defined below:
  a) PLMN-A(s) (A1/A2/A3), having indicated PLMN-D(s)(D1/D2/D3) present in the EHPLMN (i.e., one of the PLMN-D(s) is expected to be present in EHPLMN list), with the highest priority (of PLMN-D(s)) if the EHPLMN list is present, or if the indicated one of the PLMN-D(s) is the HPLMN if the EHPLMN list is not present;
  b) PLMN-A(s) (A1/A2/A3), having indicated PLMN-D(s)(D1/D2/D3) present in the User Controlled PLMN Selection with Access Technology data file in the SIM, in priority order (UPLMN);
  c) PLMN-A(s) (A1/A2/A3), having indicated PLMN-D(s) (D1/D2/D3) in the operator controlled PLMN selection with access technology data file in the SIM in priority order (OPLMN); and
  d) If indicated PLMN-D(s) (D1/D2/D3) is not found in any of the above lists i.e., EHPLMN list, UPLMN list, OPLMN list, then PLMN-A(s) (A1/A2/A3) can be selected in a random order for example based on the signal strength.

In one example, if there are more than one available PLMN-A(s) (PLMN A1, PLMN A2 and PLMN A3) which indicate to the UE (100) (for example by broadcast) that more than one available PLMN-A(s) support to provide disaster roaming services for same PLMN-D (For example—D1 in this case), then the UE (100) can decide the priority among the available PLMN-A(s) (A1 or A2 or A3) to select and for requesting disaster roaming services for PLMN D (For example—D1 in this case) on the following basis:
  a) On the basis of the priority of the available PLMN-A(s) (A1/A2/A3) in "disaster roaming PLMN list" configured in the UE (100) (For example—the UE (100) may prioritize and select PLMN-A(s) in order A1>A2>A3 for requesting disaster roaming services for PLMN D if priority of PLMN-A(s) in "disaster roaming PLMN list" is in order A1>A2>A3);

b) Select any of the PLMN-A(s) indicating disaster roaming services for PLMN D (For example—D1 in this case) in random order (for example based on the signal strength etc.); and c) Select any of the PLMN-A(s) indicating disaster roaming services for PLMN D (For example—D1 in this case) based on UE implementation.

In an example, if in an area, UE's last registered PLMN (PLMN D) faces disaster and the UE (100) determines there are few PLMN-A(s) indicating disaster roaming services as follows:

1. PLMN A1 indicating disaster roaming services for PLMN D1;
2. PLMN A2 indicating disaster roaming services for PLMN D2;
3. PLMN A3 indicating disaster roaming services for PLMN D3;
4. PLMN A4 indicating disaster roaming services for PLMN D2;
5. OPLMN priority of PLMN-D(s) as per UE's OPLMN list: D2>D3;
6. PLMN D1 is in UE's forbidden PLMN list; and
7. PLMN-A(s)'s priority as per "disaster roaming PLMN list": A1>A2>A3>A4.

At first, the UE (100) would select and prioritize those PLMN-A(s) which provide disaster roaming services for UE's last registered PLMN (For example—PLMN D in this case). Since there is no PLMN-A(s) providing disaster roaming services for PLMN D, the UE (100) would then select and prioritize PLMN-A(s) for disaster roaming services on the basis of the priority of the indicated PLMN-D(s) (i.e., D1, D2, D3 in this case). Since PLMN D1 is in UE's forbidden PLMN list, the UE (100) can't request for disaster roaming services for PLMN D1 on any of the available PLMN-A(s) indicating disaster roaming services for PLMN D1.

Among PLMN D2 and PLMN D3, the UE (100) would prioritize PLMN D2 (since priority of D2 is more than D3 as per UE's OPLMN list) for disaster roaming services and select any PLMN-A(s) which are indicating disaster roaming services for PLMN D2 (PLMN A2 and PLMN A4 in this case). Among PLMN A2 and PLMN A4, the UE (100) would prioritize PLMN A2 (since priority of A2 is more than A3 as per "disaster roaming PLMN list" configured in the UE (100)).

Once the UE (100) decides the priority of the available PLMN-A(s) (A1/A2/A3) (for disaster roaming service) for the selected PLMN-D (for example—PLMN D1) among one of the indicated PLMN-D(s), the UE (100) may select and request disaster roaming services for selected PLMN-D (for example—PLMN D1) from the highest priority PLMN-A for selected PLMN-D (D1) among the available PLMN-A(s)(A1/A2/A3) and try to select, camp and register (via any AS or NAS Signalling) on it. If the UE (100) fails to get disaster roaming service for selected PLMN-D (for example—PLMN D1) from the highest priority PLMN-A for selected PLMN-D (D1), the UE may select and request disaster roaming service for selected PLMN-D (for example—PLMN D1) from second highest priority PLMN-A for selected PLMN-D (D1) among the available PLMN-A(s)(A1/A2/A3) and register on the PLMN-D and so on.

Once the list of all available PLMN-A(s) indicating disaster roaming services for PLMN-D for example—PLMN D1) is exhausted, the UE (100) may select and request disaster roaming services for next selected PLMN-D based on priority among PLMN-D(s) (for example—PLMN D2) from the highest priority PLMN-A for selected PLMN-D (D2) among the available PLMN-A(s)(A1/A2/A3) and try to select, camp and register (via any AS or NAS Signalling) on the PLMN-D and so on.

In one example of higher priority PLMN search, whenever the UE (100) is registered on a PLMN-A (PLMN A1) for getting disaster roaming services for a PLMN-D (PLMN D1), following scenarios will show how and on which network the UE (100) may trigger Higher Priority PLMN Search when there are one or more PLMN-A(s) which are alive and indicating disaster roaming services for one or more PLMN-D(s).

Whenever the UE (100) is camped on the PLMN-A (For example—PLMN A1) for getting disaster roaming services for a PLMN-D (For example—PLMN D1), the UE (100) could trigger higher priority PLMN search for selecting a better network available in that area. If there are one or more PLMN-A(s) which are alive and indicating disaster roaming services for one or more PLMN-D(s), how the UE (100) may handle the higher priority PLMN search for multiple available PLMN-A(s) is not defined as part of prior art.

Whenever the UE (100) is camped on the PLMN-A (For example—PLMN A1) for getting disaster roaming services for the PLMN-D (For example—PLMN D1), the UE (100) may trigger higher priority PLMN search while not considering the selected PLMN-D (PLMN D1) with disaster condition as the PLMN selection candidate. The priority of available PLMN(s) for the higher priority PLMN search can be defined as following example.

In one example, allowable PLMN(s) (PLMN(s) not part of UE's forbidden PLMN list) (except PLMN D1) which are available to provide normal services to the UE (100) (home/roaming and not disaster roaming services) to be treated with higher priority and priority among these PLMN(s) is decided on the basis of 3GPP TS 23.122.

In one example, PLMN-A(s)(A1/A2/A3) with higher priority for disaster roaming services for one of the PLMN-D(s)(D1/D2/D3) based on the priority of the indicated PLMN-D(s)(D1/D2/D3) where priority of the PLMN-D(s) is provided. PLMN-A(s) indicating disaster roaming service for such PLMN-D(s) where is/are part of UE's forbidden list, would not be considered as a part of PLMN selection candidate for disaster roaming service for that particular PLMN-D(s) for the higher priority PLMN search. For example—If priority of PLMN-D(s) is D2>D3>D1 and the UE (100) is currently camped on PLMN A1 for disaster roaming services for PLMN D1, the UE (100) could trigger higher priority PLMN search for getting disaster roaming services for other higher priority PLMN-D(s) (D2 and D3 in this case in that priority order D2>D3>D1).

In one example, if there are multiple PLMN-A(s)(A1/A2/A3) indicating disaster roaming services for the same PLMN-D(For example—D1), the priority of the PLMN-A(s) (A1/A2/A3) for disaster roaming services for selected PLMN-D (For example—D1) can be decided based on the priority of the PLMN-A(s) as below:

a. On the basis of the priority of the available PLMN-A(s) (A1/A2/A3) in "disaster roaming PLMN list" configured in the UE (For example—UE (100) may prioritize and select PLMN-A(s) in order A1>A2>A3 for requesting disaster roaming services for selected PLMN-D (For example—D1) if priority of PLMN-A (s) in "disaster roaming PLMN list" is in order A1>A2>A3). The "disaster roaming PLMN list" could be:
i) Pre-configured in the UE (100) (ME or USIM),
ii) Updated in the UE (100) by the home network (through any NAS/AS signalling),
iii) Updated in the UE (100) by the serving network (through any NAS/AS signalling) (before the disaster condition applies), and
iv) Updated in the UE (100) by the network (Home/Serving) using steering of roaming procedure;
b. Select any of the PLMN-A(s) indicating disaster roaming services for selected PLMN-D (For example—D1) in random order (for example based on the signal strength etc.); and
c. Select any of the PLMN-A(s) indicating disaster roaming services for selected PLMN-D (For example—D1) based on UE implementation.

This is also applicable for selecting higher priority PLMN-A(s) for the selected PLMN-D (for example—D1) for which the UE (100) is already camped for disaster roaming service. (In an example—If UE (100) is camped on PLMN A2 for disaster roaming service for PLMN D1 and there is another PLMN A1 which is available and indicating disaster roaming service for PLMN D1 and if priority of A1>A2 (as per "disaster roaming PLMN list"), the UE (100) can select and prioritize A1 over A2 for disaster roaming service for D1 during Higher Priority PLMN Search).

In an example, if in an area, the UE (100) is registered on PLMN A4 for disaster roaming service for PLMN D4 and the UE triggers Higher Priority PLMN Search and determines that the available PLMN(s) in that area are as follows:
1. PLMN A1 indicating disaster roaming services for PLMN D1, PLMN D2,
2. PLMN A2 indicating disaster roaming services for PLMN D1,
3. PLMN A3 indicating disaster roaming services for PLMN D3,
4. PLMN A4 indicating disaster roaming services for PLMN D4,
5. OPLMN priority of PLMN-D(s) as per UE's OPLMN list: D1>D3>D4,
6. PLMN D2 is in UE's forbidden PLMN list, and
7. PLMN-A(s)'s priority as per "disaster roaming PLMN list": A1>A2>A3>A4.

At first, the UE (100) would select and prioritize any allowable PLMN(s) from available PLMN(s) list for the normal service (home/roaming and not disaster roaming service). Since there is no allowable PLMN(s) for normal service (home/roaming and not disaster roaming service), the UE (100) would then select and prioritize disaster roaming services among PLMN-D(s) based on the priority order of PLMN-D(s) as defined in 3GPP TS 23.122 (i.e., D1>D3>D4 in this case, disaster roaming services for D2 would not be considered as D2 is in forbidden PLMN list of the UE (100)). While searching for disaster roaming services for the highest priority PLMN-D i.e., PLMN D1 in this case, the UE (100) may select PLMN A1 among the available PLMN-A(s) (A1 and A2 in this case) indicating disaster roaming service for PLMN D1 based on the priority of PLMN-A(s) as per "disaster roaming PLMN list" configured in UE (100) (A1>A2).

Priority among the PLMNs is as below in brief which is defined in the clause 4.4.3. i.e., the UE (100) always followed below sequence to select the highest priority PLMN in a given area:

1. RPLMN;
2. HPLMN/EHPLMN;
3. UPLMN list—each PLMN/access technology combination in the "user controlled PLMN selector with access technology" data file in the SIM (in priority order);
4. OPLMN list—each PLMN/access technology combination in the "operator controlled PLMN selector with access technology" data file in the SIM (in priority order) or stored in the ME (in priority order); and
5. Random PLMN list based on signal strength.

The provided methods are applied when the UE (100) is in the automatic network selection mode. Unless explicitly mentioned for the manual network selection mode. The priority among the PLMNs list of UPLMN, OPLMN list etc., as discussed in this embodiment can be new list and different from the UPLMN, OPLMN list discussed in the prior art which can be used only during the disaster situation and configured by either HPLMN or VPLMN in the UE (100).

The PLMN selection for disaster inbound roaming service: The UE (100) may first select a PLMN-D based on the priority rules as described below:
1. The UE (100) selects the RPLMN as PLMN-D. The UE (100) then searches for PLMN-A which is providing disaster inbound roaming service on behalf of PLMN-D (i.e., RPLMN). If multiple PLMN-A's are available then the UE (100) can select based on priority list of PLMN-A's configured (or provisioned) in the UE (100);
2. If RPLMN is not available; and
3. The UE (100) selects the highest priority EHPLMN or HPLMN as PLMN-D-1. The UE then searches for PLMN-A which is providing disaster inbound roaming service on behalf of PLMN-D-1. If multiple PLMN-A's are available then the UE (100) can select based on priority list of PLMN-A's configured in the UE. If PLMN-D1 is not available UE selects PLMN-D2 which is next highest priority PLMN in EHPLMN list and so on.

As described below exception, the UE (100) may skip to select RPLMN and directly attempt on HPLMN or EHPLMN as PLMN-D.

In one example of exception, as an alternative option to this, if the MS is in an automatic network selection mode and the MS finds coverage of an EHPLMN, the MS may register to that EHPLMN and not return to the registered PLMN or equivalent PLMN. If the EHPLMN list is not present or is empty, and the HPLMN is available, the MS may register on the HPLMN and not return to the registered PLMN or equivalent PLMN. The operator may be able to control by SIM configuration whether an MS that supports this option is permitted to perform this alternative behavior.

If HPLMN or EHPLMN is not available, the UE (100) selects the next highest priority PLMN from UPLMN list that is called as PLMN-D3. The UE (100) then searches for PLMN-A which is providing disaster inbound roaming service on behalf of PLMN-D3. If multiple PLMN-A's are available then UE (100) can select based on priority list of PLMN-A's configured in the UE. If PLMN-D3 is not available UE selects PLMN-D4 which is next highest priority PLMN in UPLMN list and so on.

If UPLMN is not available, the UE (100) selects the next highest priority PLMN from OPLMN list that is called as PLMN-D5. The UE (100) then searches for PLMN-A which is providing disaster inbound roaming service on behalf of PLMN-D5. If multiple PLMN-A's are available then UE can select based on priority list of PLMN-A's configured in the UE (100). If PLMN-D5 is not available UE selects PLMN-D6 which is next highest priority PLMN in OPLMN list and so on.

If there is no PLMN-A which provides disaster inbound roaming service to any of the OPLMN, then the UE (100) can select any PLMN-A which is providing disaster inbound roaming service to random PLMN-D. The PLMN-A selection can be based on the signal strength. The PLMN-D may not be part of forbidden PLMN list.

Higher priority PLMN selection when the UE (100) is registered with a PLMN for disaster inbound roaming service:

1. The UE (100) may constantly look for higher priority PLMN which is configured in the UE (100) following logic the priority to receive normal services; and
2. If "1" is not available, then the UE (100) may keep searching for PLMN-A which is providing disaster inbound roaming service for highest priority PLMN-D as described in PLMN Selection for disaster inbound roaming service section.

In yet another embodiment, the UE (100) does PLMN selection as described in PLMN Selection for disaster inbound roaming service section, if none of configured PLMN-A(s) available in the disaster roaming PLMN list are available in the area.

The term UE (100) searches used in this embodiment does not mean that the UE (100) will actually trigger the PLMN search. Rather for e.g., the UE (100) can do a scan and collect the information of all the available PLMNs in the area. Based on the available PLMNs list for e.g., PLMN-A(s) the above-described logic is applied.

As described in this embodiment the UE (100) selects the PLMN-A, after which the UE (100) triggers registration on the PLMN-A to get registered with PLMN-A to receive disaster inbound roaming service. In an embodiment, the UE (100) does selection of the first-PLMN (called as PLMN-D), then the UE (100) searches for second-PLMN which is providing disaster inbound roaming services for first-PLMN. Once the UE (100) is able to successfully search and select the second PLMN the UE (100) triggers a registration for disaster inbound roaming services on the second PLMN. Optionally during the registration procedure UE (100) will indicate the first PLMN information to the second PLMN.

The various actions, acts, blocks, steps, or the like in the flow charts (S300, S400 and S900) may be performed in the order presented, in a different order or simultaneously. Further, in some embodiments, some of the actions, acts, blocks, steps, or the like may be omitted, added, modified, skipped, or the like without departing from the scope of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) for selecting a public land mobile network (PLMN) to receive a disaster roaming service in an area, the method comprising:
   detecting a disaster condition in the area;
   detecting at least one forbidden PLMN (FPLMN) broadcasting information about at least one PLMN with the disaster condition for which disaster roaming is offered in the area;
   determining a first PLMN with the disaster condition from the at least one PLMN with the disaster condition based on information about the at least one PLMN with the disaster condition and a predefined priority;
   selecting at least one of the at least one FPLMN corresponding to the determined first PLMN with the disaster condition; and
   attempting a registration procedure on the at least one selected FPLMN by transmitting a registration request message,
   wherein the registration request message includes information about the determined first PLMN with the disaster condition.

2. The method of claim 1, wherein the predefined priority comprises at least one of:
   a registered PLMN (RPLMN),
   a home PLMN (HPLMN), or a highest priority equivalent home PLMN (EHPLMN) that is available if a EHPLMN list is present,
   each PLMN in a user controlled PLMN selector with access technology data file in a subscriber identify module (SIM) in a priority order, or
   each PLMN in an operator controlled PLMN selector with access technology data file in the SIM in the priority order or stored in the UE in the priority order and a random order.

3. The method of claim 1, wherein the determined first PLMN with the disaster condition comprises a PLMN that is not part of a FPLMN list configured at the UE.

4. The method of claim 1, further comprising detecting the disaster condition in case that the at least one FPLMN is available in the area and the least one FPLMN broadcasts the information about the at least one PLMN with the disaster condition.

5. The method of claim 1, wherein the registration request message includes the determined first PLMN with the disaster condition.

6. The method of claim 1, wherein determining the first PLMN with the disaster condition further comprises:
   determining the first PLMN with the disaster condition with a highest priority from the at least one PLMN with the disaster condition; and
   selecting the first PLMN with the disaster condition with the highest priority broadcast by the at least one FPLMN.

7. The method of claim 1, further comprising:
   determining whether the at least one FPLMN broadcasts information about the determined first PLMN and a list of PLMNs to be used in the disaster condition is configured by a serving PLMN; and
   selecting the at least one FPLMN with a highest priority in the list of PLMNs to be used in the disaster condition as a finally selected FPLMN in response to determining that the at least one FPLMN broadcasts the information about the determined first PLMN and the list of PLMNs to be used in the disaster condition is configured by the serving PLMN; or randomly selecting one of the FPLMN as the finally selected FPLMN in response to determining that the at least one FPLMN broadcasts the information about the determined first PLMN and the list of PLMNs to be used in the disaster condition is not configured at the UE by the determined first PLMN or at least one FPLMN broadcasts the information about the determined first PLMN being not part of the list of PLMNs to be used in the disaster condition.

8. The method of claim 7, wherein the list of PLMNs to be used in the disaster condition is configured in the UE based on the serving PLMN before the disaster condition occurs.

9. A user equipment (UE) for selecting a public land mobile network (PLMN) to receive a disaster roaming service in an area, the UE comprising:
   a transceiver; and
   at least one processor coupled to the transceiver, wherein the at least one processor is further configured to:
      detect a disaster condition in the area,
      detect at least one forbidden PLMN (FPLMN) broadcasting information about at least one PLMN with the disaster condition for which disaster roaming is offered in the area,
      determine a first PLMN with the disaster condition from the at least one PLMN with the disaster based on information about the at least one PLMN with the disaster condition and a predefined priority,
      select at least one of the at least one FPLMN corresponding to the determined first PLMN with the disaster condition, and
      attempt a registration procedure on the at least one selected FPLMN by transmitting a registration request message,
   wherein the registration request message includes information about the determined first PLMN with the disaster condition.

10. The UE of claim 9, wherein the predefined priority comprises at least one of:
   a registered PLN (RPLMN),
   a home PLMN (HPLMN), or a highest priority equivalent home PLMN (EHPLMN) that is available if a EHPLMN list is present,
   each PLMN in a user controlled PLMN selector with access technology data file in a subscriber identify module (SIM) in a priority order, or
   each PLMN in an operator controlled PLMN selector with access technology data file in the SIM in the priority order or stored in the UE in the priority order, and a random order.

11. The UE of claim 9, wherein the determined first PLMN with the disaster condition comprises a PLMN that is not part of a FPLMN list configured at the UE, and
   wherein the at least one processor is further configured to detect the disaster condition in case that the at least one FPLMN is available in the area and the least one FPLMN broadcasts the information about at least one PLMN with disaster condition.

12. The UE of claim 9, wherein the registration request message includes the determined first PLMN with the disaster condition.

13. The UE of claim 9, wherein the at least one processor is further configured to:
   determine the first PLMN with the disaster condition with a highest priority from the at least one PLMN with the disaster condition, and
   select the first PLMN with the disaster condition with the highest priority broadcast by the at least one FPLMN.

14. The UE of claim 9, wherein the at least one processor is further configured to:
   determine whether the at least one FPLMN broadcasts information about the determined first PLMN and a list of PLMNs to be used in the disaster condition is configured by a serving PLMN, and
   select the at least one FPLMN with a highest priority in the list of PLMNs to be used in the disaster condition as a finally selected FPLMN in response to determining that the at least one FPLMN broadcasts the information about the determined first PLMN and the list of PLMNs to be used in the disaster condition is configured by the serving PLMN, or
   randomly select one of the FPLMN as the finally selected FPLMN in response to determining that the at least one FPLMN broadcasts the information about the determined first PLMN and the list of PLMNs to be used in the disaster condition is not configured at the UE by the determined first PLMN or at least one FPLMN broadcasts the information about the determined first PLMN being not part of the list of PLMNs to be used in the disaster condition.

15. The UE of claim 14, wherein the list of PLMNs to be used in the disaster condition is configured in the UE based on the serving PLMN before the disaster condition occurs.

* * * * *